United States Patent
Mimura

(10) Patent No.: US 6,484,858 B1
(45) Date of Patent: *Nov. 26, 2002

(54) FRICTION CLUTCH AND AUTOMATIC TRANSMISSION OF AUTOMOBILE USING THE SAME AND NON-STAGE TRANSMISSION OF AUTOMOBILE AND POWER DISTRIBUTION DEVICE OF AUTOMOBILE AND POWER TRANSMISSION DEVICE OF MOTORCYCLE

(76) Inventor: Kenji Mimura, 29-1105, Wakabadai 4-chome, Asahi-ku, Yokohama-shi, Kanagawa 251-0801 (JP)

( * ) Notice: Subject to any disclaimer, the term of this patent is extended or adjusted under 35 U.S.C. 154(b) by 8 days.

This patent is subject to a terminal disclaimer.

(21) Appl. No.: 09/599,551

(22) Filed: Jun. 23, 2000

(30) Foreign Application Priority Data

Jun. 25, 1999 (JP) .............................................. 11-179841

(51) Int. Cl.⁷ ..................... F16D 41/064; B60K 17/354; F16H 55/52; F16H 3/44
(52) U.S. Cl. ....................... 192/45; 180/247; 192/85 A; 192/89.26; 474/8; 475/269
(58) Field of Search ...................... 192/45, 66.2, 66.23, 192/65, 85 A, 89.26; 180/247; 475/269, 271; 474/8

(56) References Cited

U.S. PATENT DOCUMENTS

| 1,670,197 A | * | 5/1928 | Humfrey ...................... 192/45 |
| 3,557,921 A | * | 1/1971 | Takada .......................... 192/45 |
| 4,083,419 A | * | 4/1978 | Fogelberg ................. 192/45 X |
| 5,035,309 A | * | 7/1991 | Takada .......................... 192/45 |
| 5,067,601 A | * | 11/1991 | Castens ......................... 192/65 |
| 5,129,870 A | * | 7/1992 | Pierce .......................... 475/285 |
| 5,211,273 A | * | 5/1993 | Castens ......................... 192/45 |
| 5,328,012 A | * | 7/1994 | Takata .......................... 192/45 |
| 5,381,879 A | * | 1/1995 | Takata .......................... 192/45 |
| 5,411,218 A | * | 5/1995 | Uehara et al. ............. 192/45 X |
| 5,672,132 A | * | 9/1997 | Schwab .......................... 474/8 |
| 5,720,371 A | * | 2/1998 | Kimura et al. ............. 192/45 X |
| 6,056,664 A | * | 5/2000 | Mimura ....................... 475/246 |
| 6,148,978 A | * | 11/2000 | Mimura ......................... 192/45 |
| 6,155,395 A | * | 12/2000 | Braford .................... 180/247 X |
| 6,298,966 B1 | * | 10/2001 | Mimura ......................... 192/45 |

FOREIGN PATENT DOCUMENTS

| JP | 5-209636 | * | 8/1993 |
| JP | 2000-186752 | | 7/2000 |
| WO | WO 94/27057 A1 | * | 11/1994 |

* cited by examiner

Primary Examiner—Rodney H. Bonck
(74) Attorney, Agent, or Firm—Lowe Hauptman Gilman & Berner, LLP

(57) ABSTRACT

The present invention relates to a friction clutch having a pair of clutch members opposite to each other in a radial direction with a plurality of rollers held between them, an angle of a turning axis of each roller relative to the rotation axis of a clutch member is made more than 10° and less than 20°, and in the meantime, the angle of the turning axis of each roller relative to the plane including the rotation axis of the clutch member is made more than 25° and less than 90°, so that a stable frictional force may be generated at all times. In this case, when a load in an axial direction is added to the clutch member, each roller generates sliding friction while turning, and therefore, a wear is extremely smaller than that of a structure of bringing the respective fellow clutch plates into surface contact with each other like a multiple disk clutch.

10 Claims, 16 Drawing Sheets

FRICTION CLUTCH AND AUTOMATIC TRANSMISSION OF AUTOMOBILE USING THE SAME AND NON-STAGE TRANSMISSION OF AUTOMOBILE AND POWER DISTRIBUTION DEVICE OF AUTOMOBILE AND POWER TRANSMISSION DEVICE OF MOTORCYCLE

BACKGROUND OF THE INVENTION

1. Field of the Invention

The present invention relates to a friction clutch used for power transfer of various machines and an automatic transmission of an automobile using the friction clutch and a non-stage transmission of an automobile and a power distribution device of an automobile and a power transmission device of a motorcycle.

2. Description of the Prior Art

Previously, as a clutch used for various power transfer mechanisms, a so-called multiple disk clutch has been well known, in which a lot of clutch plates rotating integrally with a member on the input side and a lot of clutch plates rotating integrally with a member on the output side are alternately arranged, and the respective clutch plates are pressed onto each other, so that the torque on the input side may be transferred to the output side by frictional force of each clutch plate.

This multiple disk clutch is widely used for an automatic transmission of an automobile, a non-stage transmission of an automobile, a power distribution device of an automobile, and a power transmission device of a motorcycle or the like, since the respective fellow clutch plates can be connected while being properly slid.

For example, in a general automatic transmission of an automobile, the rotational ratio of the output shaft to the input shaft is changed step by step by changing the combination of a lot of gears making up the power transmission passage, and therefore, by using a plurality of multiple disk clutches as a mechanism for arbitrarily regulating the rotation of a specific gear at the time of changing speed, the shock of speed changing is relieved by utilizing sliding when connecting each multiple disk clutch.

Furthermore, a non-stage transmission which is put in practice in part of automobiles is configured so that the speed may be continuously changed by using a pair of variable diameter pulleys and a V-belt. In this case, by using a multiple disk clutch as a starting clutch, an effective creeping (state where a little power is transmitted to the drive wheel side without pressing down the accelerator) is generated at the starting time by utilizing sliding of the multiple disk clutch.

Furthermore, as a power distribution device of an automobile, a device is well known, in which normally, the power of an engine is transmitted to a drive shaft on the front wheel side or the rear wheel side to perform two-wheel drive, and according to the running state or the like, the drive force is transmitted to both drive shafts on the front wheel side and the rear wheel side, respectively to perform four-wheel drive. In this case, when performing four-wheel drive, each of the drive shafts on the front wheel side and the rear wheel side is connected by a multiple disk clutch, and by utilizing sliding of the multiple disk clutch, the torque distribution to the front wheel side or the rear wheel side is controlled.

Furthermore, in a power transmission device of a motorcycle, the weight of the vehicle body is light relative to the maximum power of the engine, and therefore, by using a so-called wet multiple disk clutch, a sudden transmission of the power when starting is prevented by sliding of the respective fellow clutch plates.

However, in the above described multiple disk clutch, there are many cases where each clutch plate is used while being slid, and therefore, in the sliding state, the oil film between the respective clutch plates is cut off so that the clutch plate may easily wear away, which is disadvantageous in durability. Therefore, in an automatic transmission using gears, the sliding state of the clutch plate is reduced in the connection of the clutch at the time of changing speed, but since the torque is transmitted suddenly according to the decrease of the state of sliding, there has been such a problem that the shock of speed changing cannot be sufficiently relieved. Furthermore, in a non-stage transmission using a multiple disk clutch for starting, in order to decrease the wear of the clutch plate, the thrust force of the fellow clutch plates when a creeping occurs is reduced, and therefore, when compared with an automatic transmission using a torque converter, at present, it is a limit to generate a creeping force of approximately half degree thereof, which has been practically disadvantageous. Furthermore, in a power distribution device of an automobile, it is also necessary to continuously slide the clutch plate when controlling the torque distribution, and therefore, there has been a problem of easily generating the wear of a clutch plate. Furthermore, in a power transmission device of a motorcycle, since the clutch operation is artificially performed, the life of a clutch plate is shortened in the situation of frequently performing half-clutch, and there has been a problem of increasing the frequency of replacement and repair.

SUMMARY OF THE INVENTION

The present invention is achieved due to the above described problems, and it is an object of the present invention to provide a friction clutch capable of decreasing the wear in the sliding state and an automatic transmission of an automobile using the friction clutch and a non-stage transmission of an automobile and a power distribution device of an automobile and a power transmission device of a motorcycle.

In order to attain the above described object, a friction clutch of the present invention comprises: a pair of clutch members which are coaxially and relatively rotatably arranged with the peripheral surfaces opposite to each other in the radial direction and in which the respective opposite surfaces are formed to be inclined from one end side toward the other end side in the axial direction; a lot of rollers which are arranged between the opposite surfaces of the respective clutch members; a holder which rotatably holds each roller mutually at intervals in the circumferential direction of each clutch member; and thrust means which can thrust in the axial direction at least one of the respective clutch members in the direction in which the opposite surfaces of the respective clutch members approach each other, wherein the turning axis of each roller is inclined to have a specific angle relative to the rotation axis of the clutch member and in the meantime, the inclination angle thereof is made more than 10° and less than 20°, and the turning axis of each roller is each inclined in the same direction to have a specific angle relative to the plane including the rotation axis of the clutch member and in the meantime, the inclination angle thereof is made more than 25° and less than 90°.

According to this configuration, when a load in the axial direction is applied to each clutch member by the thrust means and each clutch member is relatively rotated while being brought into contact with each roller, each roller which tends to turn in the direction inclined relative to the rotary track of the clutch member turns along the rotary track of the clutch member while being restricted by the holder, and therefore, a frictional force by the sliding and turning of each roller is generated between each roller and each clutch member. At that moment, in one rotational direction of the clutch member, each roller tends to turn in one axial direction of the clutch member, and in the other rotational direction of the clutch member, each roller tends to turn in the other axial direction of the clutch member, and therefore, different frictional forces are generated depending on the rotational direction of the clutch member, respectively. In this case, by making the inclination angle of the turning axis of each roller relative to the rotation axis of the clutch member more than 10° and less than 20° and the inclination angle of the turning axis of each roller relative to the plane including the rotation axis of the clutch member more than 25° and less than 90°, an effective and stable frictional force is generated at all times. As a result of this, the wear can be made extremely smaller than that of the structure in which the respective fellow clutch plates are brought into surface contact with each other like a multiple disk clutch, and the durability can be remarkably improved. Furthermore, since different frictional forces can be generated depending on the rotational directions of the clutch member, respectively, it is very advantageous in a case where such an operation is the object.

Furthermore, in order to attain the above described object, the friction clutch of the present invention comprises: a pair of clutch members which are coaxially and relatively rotatably arranged with the peripheral surfaces opposite to each other in the radial direction and in which the respective opposite surfaces are formed to be inclined from one end side toward the other end side in the axial direction; a lot of rollers which are arranged between the opposite surfaces of the respective clutch members; a holder which rotatably holds each roller mutually at intervals in the circumferential direction of each clutch member; and thrust means which can thrust in the axial direction at least one of the respective clutch members in the direction in which the opposite surfaces of the respective clutch members approach each other, wherein the turning axis of each roller is inclined to have a specific angle relative to the rotation axis of the clutch member and in the meantime, the inclination angle thereof is made more than 3° and less than 8°, and the turning axes of the respective rollers are inclined in the opposite directions to: have a specific angle relative to the plane including the rotation axis. of the clutch member, a specific number of pieces by a specific number of pieces and in the meantime, the inclination angle thereof is made more than 25° and less than 90°.

According to this configuration, when a load in the axial direction is applied to each clutch member by the thrust means and each clutch member is relatively rotated while being brought into contact with each roller, each roller which tends to turn in the direction inclined relative to the rotary track of the clutch member turns along the rotary track of the clutch member while being restricted by the holder, and therefore, a frictional force by the sliding and turning of each roller is generated between each roller and each clutch member. At that moment, when the clutch member is rotated in an arbitrary direction, part of rollers inclined mutually in the same direction tend to turn in one axial direction of the clutch member, and the rollers inclined in the other direction tend to turn in the other axial direction of the clutch member, and therefore, by the number of pieces of rollers inclined mutually in the opposite directions, it is possible to arbitrarily set the magnitude of the frictional force in each rotational direction of the clutch member. In this case, by making the inclination angle of the turning axis of each roller relative to the rotation axis of the clutch member more than 3° and less than 8° and the inclination angle of the turning axis of each roller relative to the plane including the rotation axis of the clutch member more than 25° and less than 90°, an effective and stable frictional force is generated at all times. Consequently, similarly to the above description, the improvement of durability can be considerably attained, and in the meantime, it is possible to arbitrarily set the magnitude of the frictional force in each rotational direction of the clutch member, and therefore, it can be applied in a wide range according to the use.

Furthermore, in the above described friction clutch, the rollers inclined mutually in the opposite directions relative to the plane including the rotation axis of the above described clutch member are alternately arranged in the circumferential direction of the clutch member, by the same numbers, and consequently, an equal frictional force is generated regardless of the rotational direction of the clutch member. Accordingly, it is very advantageous in the case where such an operation is the object.

Furthermore, in the above described friction clutch, the above described respective clutch members are provided in the axial direction, in a plurality of pieces, and consequently, it is possible to arbitrarily set the magnitude of the frictional force according to the number of the respective clutch members. Accordingly, a frictional force complying with the object can be obtained.

Furthermore, in the above described friction clutch, the contact surface to the roller in the above described respective clutch members is each formed to be convex to the outer peripheral surface of the roller in the cross section including the turning axis of the roller, and consequently, it is possible to reduce the contact pressure on both end sides in the axial direction of each roller. Accordingly, the wear one-sided in the axial direction does not occur in each roller, and the durability of each roller can be improved.

Furthermore, in the above described friction clutch, the outer peripheral surface of the roller brought into contact with the above described respective clutch members is each formed to be convex to the contact surface of each clutch member in the cross section including the turning axis of the roller, and consequently, similarly to the above description, it is possible to decrease the contact pressure on both end sides in the axial direction of each roller, and the wear one-sided in the axial direction does not occur in each roller, and the durability of each roller can be improved.

Furthermore, in order to attain the above described object, the present invention is an automatic transmission of an automobile, comprising: an input shaft and an output shaft which are arranged mutually coaxially; a torque converter which transmits the power between the input shaft side and the engine side; at least one central gear which is arranged coaxially with; the input shaft and the output shaft; at least one pair of planetary,gears which are rotatably held by a holder rotatable around the input shaft and the output shaft and which are engaged with the central gear; at least one internal gear which is engaged with the planetary gear; a plurality of clutches which can regulate the relative rotation between specific members among an engine side member of the torque converter, the above described input shaft side member of the torque converter, the central gear, the holder of the planetary gear, the internal gear, and the transmission main body; and control means which each controls the connection and cut-off of each clutch according to the change of speed respectively, wherein a plurality of above described friction clutches are provided as the above described respective clutches, and each clutch member of each friction clutch is individually provided between specific members among the engine side member of the above described torque converter, the above described input shaft side member of the torque converter, the central gear, the holder of the planetary gear, the internal gear, and the transmission main body, and the thrust means of each friction clutch is controlled respectively by the above described control means. Consequently, when the above described clutch is connected while changing speed, each roller turns while sliding, so that a frictional force may be generated. As a result of this, the wear of each clutch can be extremely reduced, and it is possible to connect the clutch after continuing the sliding state of each clutch for a long time when changing speed. Accordingly, the shock in changing speed can be largely reduced.

Furthermore, in order to attain the above described object, the present invention is a non-stage transmission of an automobile, comprising: a first variable diameter pulley which rotates integrally with the input shaft; a second variable diameter pulley which rotates integrally with the output shaft; a belt which is wound up on each pulley; a starting clutch which is arranged between the output shaft and the drive wheel side; and control means which controls the connection and cut-off of the clutch, wherein the above described friction clutch is provided as the above described clutch, and one clutch member of the friction clutch is provided on the engine side and in the meantime, the other clutch member of the friction clutch is provided on the input shaft side, and. the thrust means of the friction clutch is controlled by the above described control means. Consequently, when the above described clutch is connected while transmitting the power of the output shaft to the drive wheel side, each roller turns while sliding, so that a frictional force may be generated. As a result of this, the wear of the clutch can be extremely reduced, and the sliding friction of the clutch can be increased when a creeping occurs. Accordingly, it is possible to obtain a practically sufficient creeping force.

Furthermore, the present invention is a power distribution device of an automobile, comprising: a clutch arranged between a drive shaft on the front wheel side and a drive shaft on the rear wheel side of an automobile; and control means for controlling the connection and cut-off of the clutch, so that the power of the engine to be transmitted to a drive shaft on the front wheel side or on the rear wheel side may be transmitted to both drive shafts on the front wheel side and on the rear wheel side by the connection of the above described clutch, wherein the above described friction clutch is provided as the above described clutch, and one clutch member of the friction clutch is provided to one of the drive shafts on the front wheel side and on the rear wheel side and in the meantime, the other clutch member of the friction clutch is provided to the other of the drive shafts on the front wheel side and on the rear wheel side, and the thrust means of the friction clutch is controlled by the above described control means. Consequently, when the above described clutch is connected while transmitting the power to both drive shafts on the front wheel side and on the rear wheel side, each roller turns while sliding, so that a frictional force may be generated. As a result of this, when distributing the power to the drive wheel on the front wheel side or on the rear wheel side, even in the case of arbitrarily controlling the torque distribution ratio by using the sliding of the clutch, the wear of the clutch can be extremely reduced. Accordingly, the improvement of durability can be attained.

Furthermore, the present invention is a power transmission device of a motorcycle having a clutch for intermittently transmitting the power of the engine to the drive wheel side by the operation of a clutch lever, wherein the above described friction clutch is provided as the above described clutch, and one clutch member of the friction clutch is provided on the engine side and in the meantime, the other clutch member of the friction clutch is provided on the drive wheel side, and the thrust means of the friction clutch is controlled by the above described clutch lever. Consequently, when the above described clutch is connected while transmitting the power of the engine to the drive wheel side, each roller turns while sliding, so that a frictional force may be generated. As a result of this, even in the case of often using the half-clutch when starting or changing speed, the wear of the clutch can be extremely reduced, and the improvement of durability can be attained. In this case, by making the setting so that the rotational direction of a larger frictional force may be on the acceleration side, the frictional force in deceleration can be reduced, and therefore, the excessive engine brake of, for example, a 4-cycle engine can be relieved, which is practically extremely effective.

DESCRIPTION OF THE PREFERRED EMBODIMENTS

Figure 1:
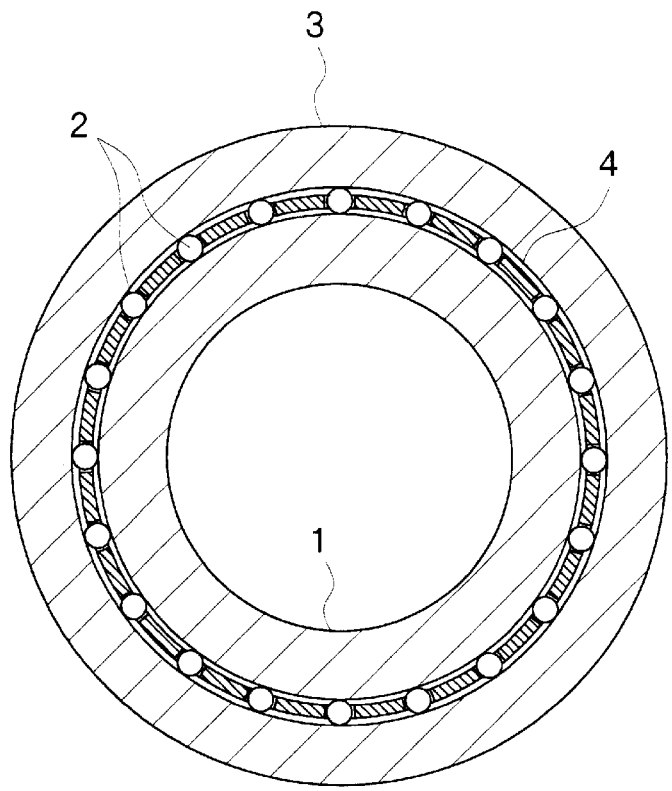
FIG. 1 is a front cross sectional view of a friction clutch showing a first embodiment of the present invention.

FIG. 1 to FIG. 7 show a first embodiment of the present invention.

This friction clutch comprises: one clutch member 1 which rotates around a shaft center; a lot of rollers 2 which are arranged along a rotary track of the clutch member 1; the other clutch member 3 which is opposite to one clutch member 1 in the radial direction with each roller 2 between them; a cage 4 which rotatably holds each roller 2 mutually at intervals; and unillustrated thrust means. Furthermore, these are the minimum components configuring a friction clutch, and actually, the clutch members 1, 3 are connected to other transmitting members or the like, respectively.

Figure 2:
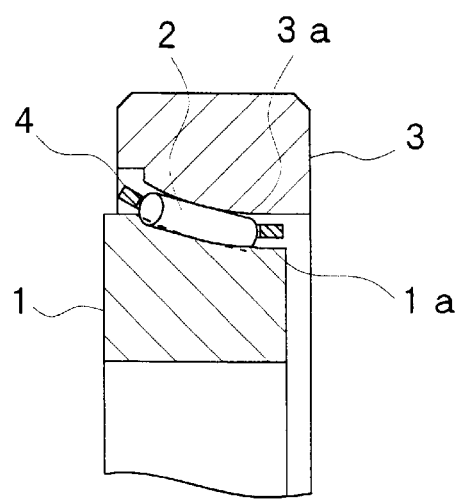
FIG. 2 is a side cross sectional view of a principal part of the friction clutch.

One clutch member 1 is formed like a ring around the rotation axis thereof, and on the outer peripheral surface thereof, an inside track surface 1a facing to the other clutch member 3 is formed. The inside track surface 1a is tapered around the rotation axis of the clutch member 1 and in the meantime, it is formed to be a concave curve in the cross section in parallel with the rotation axis of the clutch member 1 as shown in FIG. 2.

Each roller 2 has an outer peripheral surface shaped like a pillar uniformly extending in the axial direction, and it is arranged in the circumferential direction of the clutch member 1 at equal intervals.

The other clutch member 3 is formed like a ring around the rotation axis of one clutch member 1, and on the inner peripheral surface thereof, an outside track surface 3a facing to one clutch member 1 is formed. The outside track surface 3a is tapered around the rotation axis of one clutch member 1 and in the meantime, it is formed to be a convex curve in the cross section in parallel with the rotation axis of one clutch member 1 as shown in FIG. 2.

Figure 3:
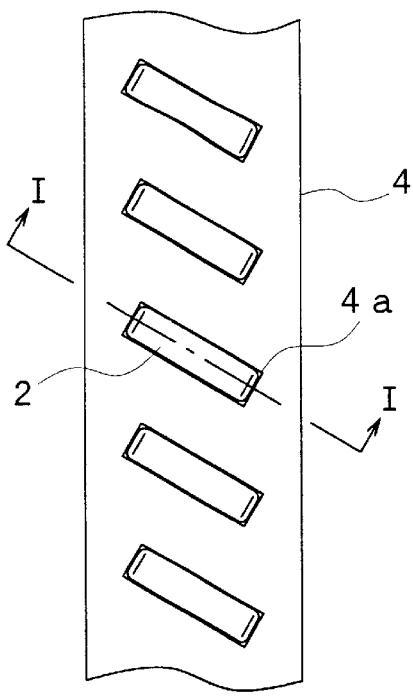
FIG. 3 is a plan view of a roller and a cage.

The cage 4 is formed like a ring around the rotation axis of one clutch member 1, and it is curvedly tapered along each of the track surfaces 1a, 3a and in the meantime, the thickness thereof is formed smaller than the outside diameter of each roller 2. In the cage 4, a lot of holes 4a for rotatably containing each roller 2 are provided, and each hole 4a is arranged at equal intervals in the circumferential direction of the cage 4. Furthermore, each hole 4a is formed so that the turning axis of each roller 2 may be each inclined in the same direction as shown in FIG. 3.

Figure 4A:
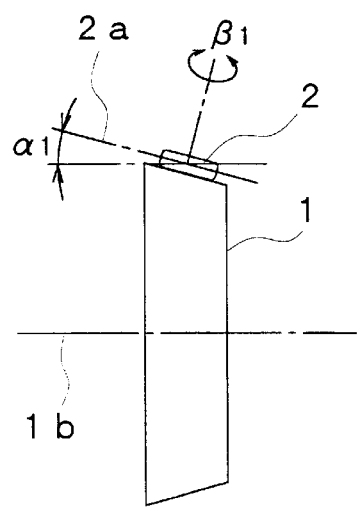
FIGS. 4A and 4B are schematic diagrams showing an inclination angle of the roller.
Figure 4B:
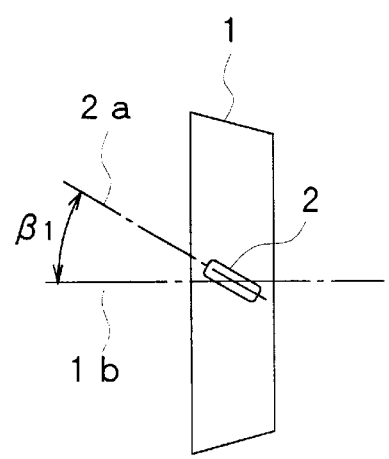

As shown in FIG. 4A, the turning axis 2a of each roller 2 each has a specific inclination angle $\alpha 1$ relative to the rotation axis 1b of the clutch member 1 and in the meantime, as shown in FIG. 4B, each has a specific inclination angle $\beta 1$ relative to the plane including the rotation axis 1b of the clutch member 1. In this case, the inclination angle $\alpha 1$ of each roller 2 is set more than 10° and less than 20°, and the inclination angle $\beta 1$ is set more than 25° and less than 90°. By the way, the inclination angle $\beta 1$ is an angle seen from the direction at right angles to the turning axis 2a of the roller 2.

Figure 5A:
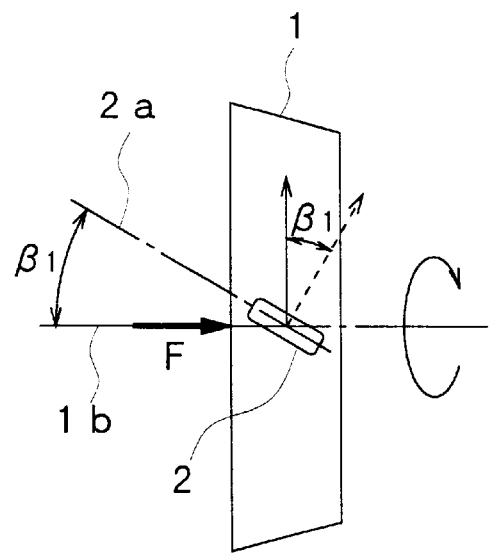
FIGS. 5A and 5B are explanation views of an operation of the friction clutch.

In the friction clutch configured as mentioned above, as shown in FIG. 5, a load F in the axial direction is applied to the clutch member 1 by the unillustrated thrust means (a spring, a hydraulic device or the like), and when rotating the clutch member 1, each roller 2 turns while coming into contact with the clutch member 1 and the clutch member 3, and following this, the cage 4 also rotates. At that moment, as shown in FIG. 5A, when the clutch member 1 is rotated in one direction (hereafter, referred to as forward rotation), each roller 2 tends to turn in one axial direction of the clutch member 1, that is, in the direction inclined relative to the rotary track by the angle $\beta 1$ (direction of decreasing the diameter of the clutch member 1) as shown by the broken line arrow in the figure, but it turns while sliding along the rotary track of the clutch member 1 as shown by the solid line arrow in the figure while being restricted by the cage 4, and therefore, between each roller 2 and each of the clutch members 1, 3, a frictional force proportional to the load F in the axial direction is generated. In this case, by the turning of each roller 2, the torque of one clutch member 1 is gradually transmitted to the other clutch member 3 side and in the meantime, in the case where the load F is larger than a specific thrust force, the turning of each roller 2 stops, so that the torque of one clutch member 1 may be completely transmitted to the other clutch member 3 side. Furthermore, when releasing the load F to the clutch member 1, the torque of one clutch member 1 is not transmitted to the other clutch member 3 side.

Figure 5B:
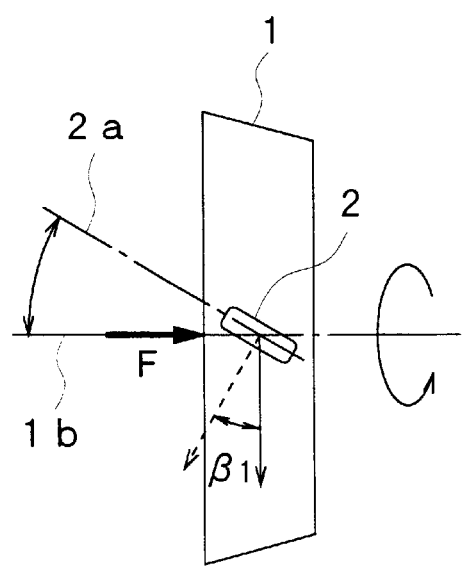

Furthermore, as shown in FIG. 5B, at the time of rotating the clutch member 1 in the other direction (hereafter, referred to as the reverse direction), each roller 2 tends to turn in the other axial direction of the clutch member 1, that is, in the direction inclined by the angle $\beta 1$ relative to the rotary track as shown by a broken line arrow in the figure (direction of increasing the diameter of the clutch member 1), but it turns along the rotary track of the clutch member 1 as shown by the solid line arrow in the figure while being restricted by the cage 4, and therefore, a frictional force proportional to the load F in the axial direction is generated between each roller 2 and each of the clutch members 1, 3. At that moment, since each roller 2 generates a sliding friction while turning, a static friction is not generated, and a stable resistance force by a dynamic friction can be obtained at all times, and even if a static friction is generated at the beginning, it changes to a dynamic friction immediately by the turning of the roller 2. Furthermore, in the forward rotation of the clutch member 1, each roller 2 turns in the direction of decreasing the diameter of the clutch member 1, and in the reverse rotation, each roller 2 turns in the direction of increasing the diameter of the clutch member 1, and therefore, even in case of an equal load F, the magnitude of the frictional force to be generated is each different depending on the rotational direction of the clutch member 1. In this case, the frictional force in the forward rotation is larger than the frictional force in the reverse rotation.

By the way, the applicant has confirmed the relation between the inclination angles $\alpha 1$, $\beta 1$ of each roller and the frictional torque P in the range of the inclination angle $\alpha 1$ of 3° to 40° and the range of the inclination angle $\beta 1$ of 5° to 85° by experiments and theoretical analysis.

Figure 6:
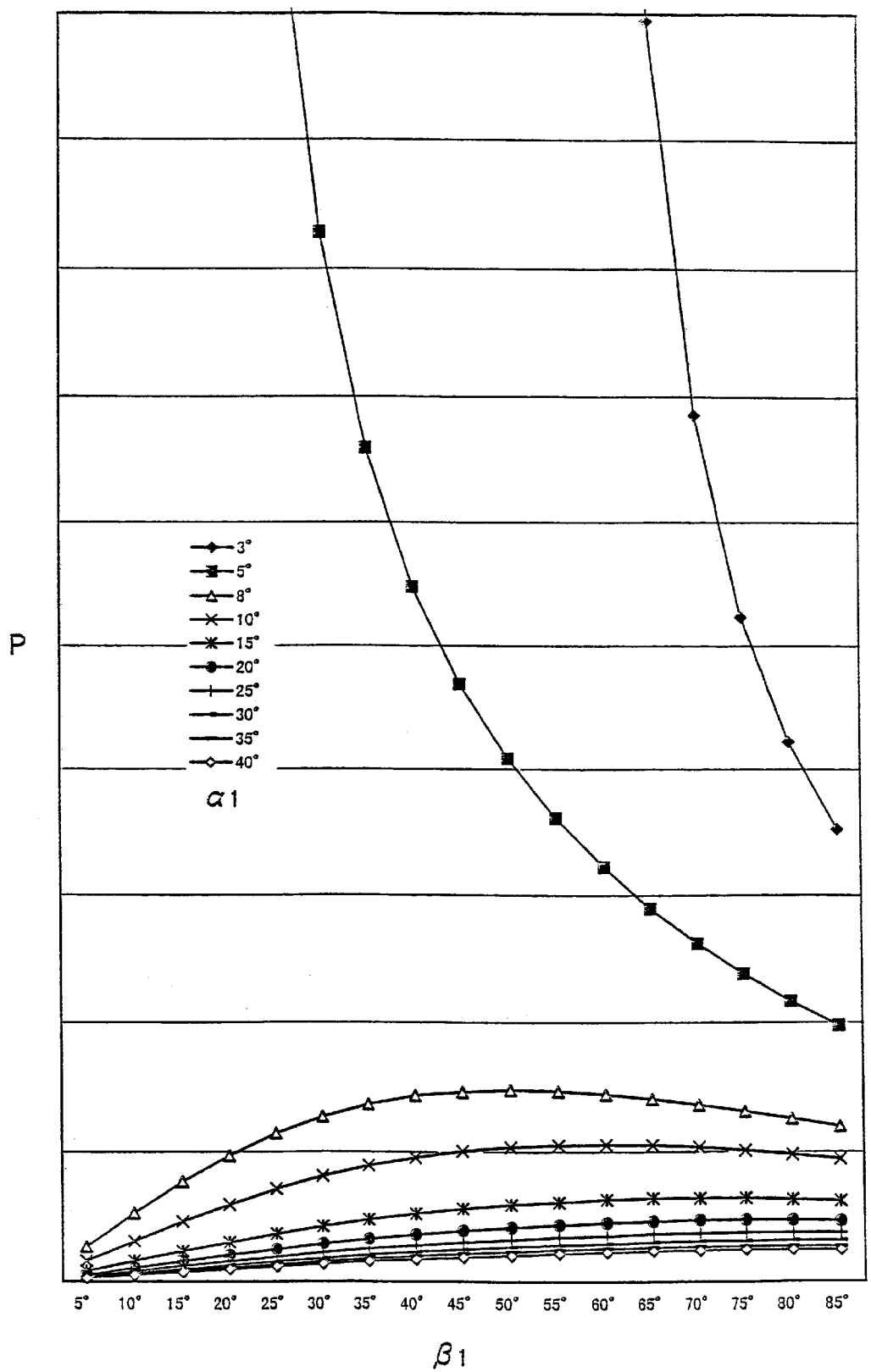
FIG. 6 is a view showing the relation between the inclination angle of the roller and a frictional torque.
Figure 7:
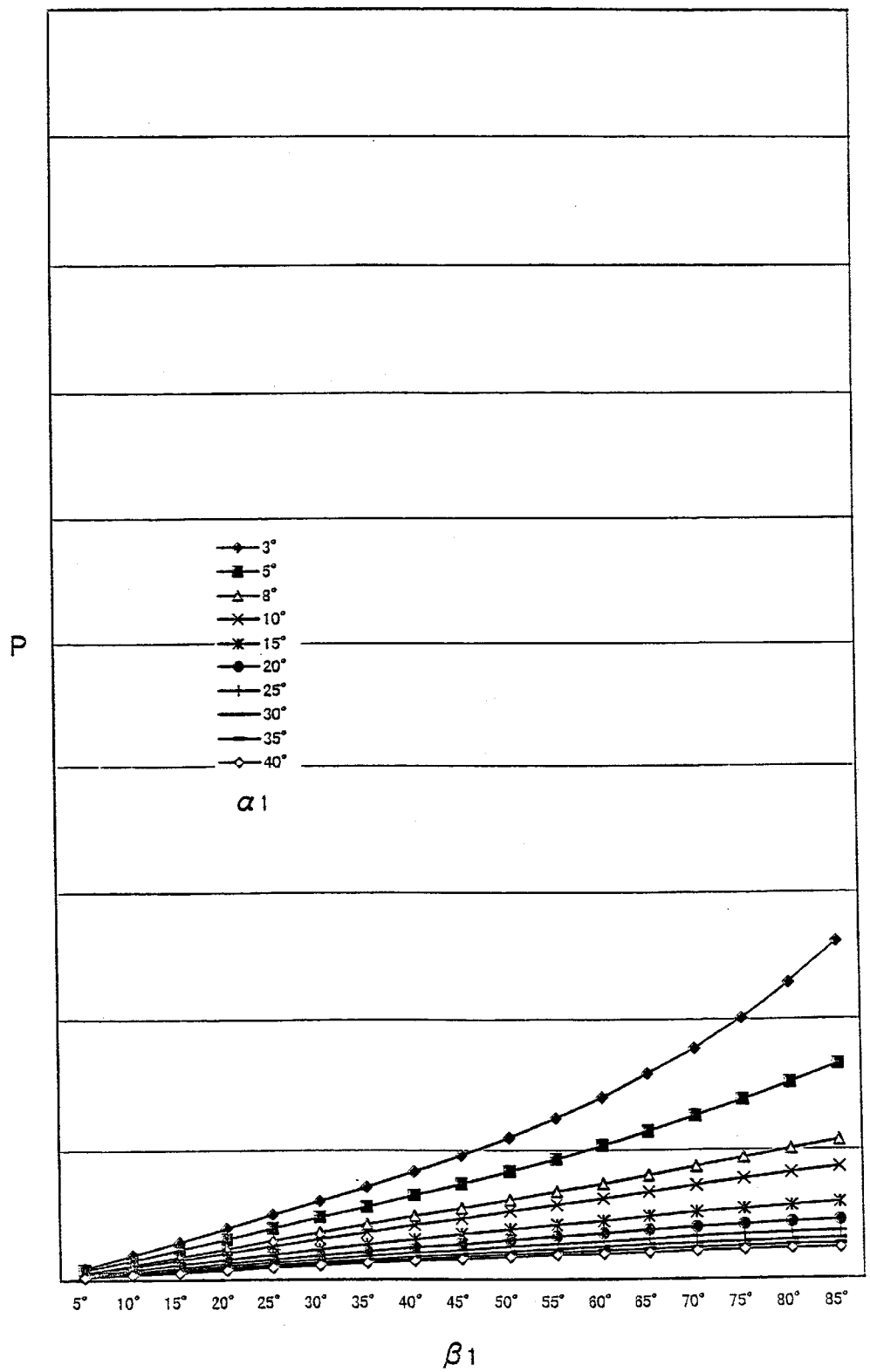
FIG. 7 is a view showing the relation between the inclination angle of the roller and the frictional torque.
Figure 8:
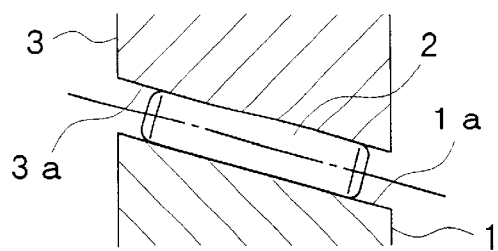
FIG. 8 is a cross sectional view in a direction denoted by an arrow of a line I—I in FIG. 3 showing a case where each track surface and an outer peripheral surface of the roller are linearly formed.

That is, as shown in FIG. 6, in the case where the inclination angle $\alpha 1$ of each roller in the forward rotation of the clutch member 1 is 5° or less, a characteristic is shown, in which the frictional torque P suddenly increases according to the decreasing of the inclination angle β1, and a state is made, where the respective clutch members 1, 3 are easily locked with each other. Furthermore, in the case where the inclination angle α1 is more than 10°, no sudden fluctuation of the frictional torque P is shown, but when the inclination angle α1 is 20° or more, no frictional torque P of a practically effective value or more can be obtained regardless of the magnitude of the inclination angle β1. On the other hand, in the case where the inclination angle β1 of each roller 2 is more than 25°, no sudden fluctuation of the frictional torque P is shown except where the inclination angle α1 is 5° or less, but when the inclination angle β1 is 25° or less, the frictional torque P largely decreases, and no frictional torque P of a practically effective value or more can be obtained. Furthermore, as shown in FIG. 7, in the case of the reverse rotation of the clutch member 1, regardless of the inclination angle α1, a characteristic is shown, in which the frictional torque P uniformly decreases when the inclination angle β1 decreases, but when the inclination angle α1 becomes 20° or more, no frictional torque P of a practically effective value or more can be obtained regardless of the magnitude of the inclination angle β1. Furthermore, even in the case where the inclination angle α1 is less than 20°, no frictional torque P of a practically effective value or more can be obtained when the inclination angle β1 is 25° or less. By the way, in the case where the inclination angle β1 is more than 85°, the confirmation has not been actually performed, but it is supposed by the above described experimental data that the frictional torque P of the inclination angle β1 of 90° or less is approximately equal to that in the case of 85°.

Therefore, according to the friction clutch of the present embodiment, in the configuration of making the respective clutch members 1, 3 face to each other in the radial direction with a plurality of rollers 2 between them, the angle α1 of the turning axis of each roller 2 relative to the rotation axis of the clutch member 1 is made more than 10° and less than 20° and in the meantime, the angle β1 of the turning axis of each roller 2 relative to the plane including the rotation axis of the clutch member 1 is made more than 25° and less than 90°, and consequently, a stable frictional force can be generated at all times. In this case, when a load F is applied to the clutch member 1, each roller 2 generates sliding friction while turning, and therefore, the wear is extremely smaller than that of the structure of bringing the respective fellow clutch plates into surface contact with each other like a multiple disk clutch, and the durability can be remarkably improved. Furthermore, since different frictional forces can be generated depending on the rotational directions of the clutch member 1, respectively, it is extremely advantageous in the case where such an operation is the object.

Figure 9:
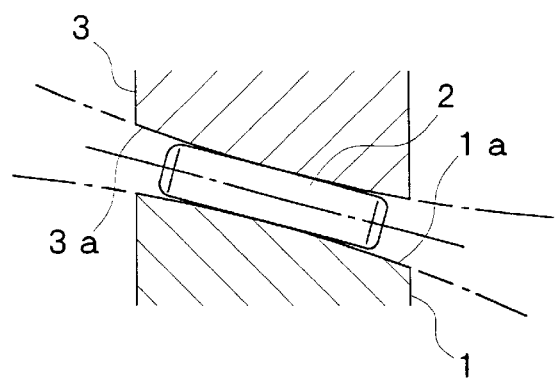
FIG. 9 is a cross sectional view in the direction shown by the arrow of the line I—I in FIG. 3 showing an example where each track surface is formed like a curve.
Figure 10:
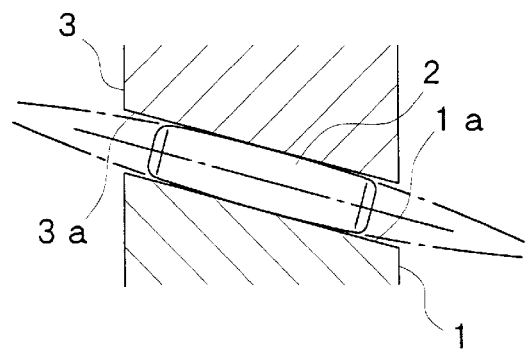
FIG. 10 is a cross sectional view in the direction shown by the arrow of the line I—I in FIG. 3 showing an example where the outer peripheral surface of the roller is formed like a curve.

Furthermore, according to the configuration of the above described embodiment, in the cross sectional view in the direction denoted by an arrow of a line I—I in FIG. 3, that is, in the cross section including the turning axis 2a, of the roller 2, in the case of bringing the inside track surface 1a and the outside track surface 3a into contact with the outer peripheral surface of the roller 2 uniformly in the axial direction, the contact pressure on both end sides in the axial direction of the roller 2 becomes larger than that on the central side. Therefore, as shown in FIG. 9, when shaping the inside track surface 1a and the outside track surface 3a in the cross section including the turning axis of the roller 2 like a curve convex to the outer peripheral surface of the roller 2, respectively, the contact pressure on both end sides in the axial direction of the roller 2 can be reduced. Accordingly, by forming the shape of the curve of each of the track surfaces 1a, 3a so that the contact pressure in the axial direction of the roller 2 may be equal, no wear one-sided in the axial direction occurs in each roller 2, and the durability of each roller 2 can be improved. As shown in FIG. 10, even in case of forming the inside track surface 1a and the outside track surface 3a linear in the cross section including the turning axis of the roller 2, an effect equal to that of the above description can be obtained by shaping the outer peripheral surface of the roller 2 like a curve convex to each of the track surfaces 1a, 3a.

Figure 11:
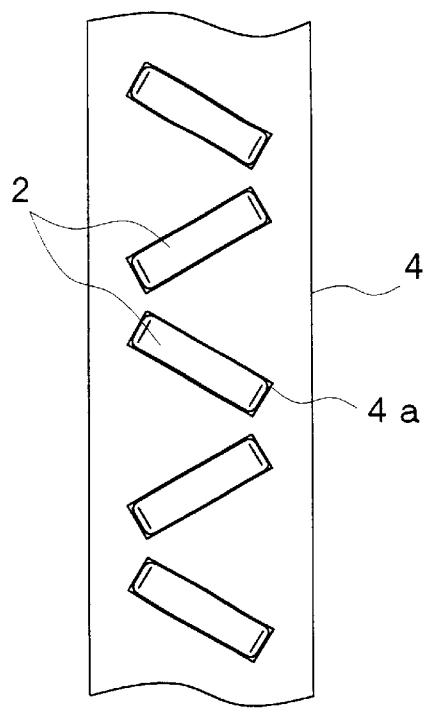
FIG. 11 is a plan view of the roller and the cage showing a second embodiment of the present invention.
Figure 12A:
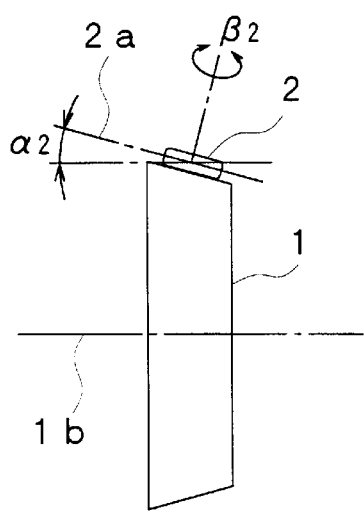
FIGS. 12A and 12B are schematic diagrams showing the inclination angle of the roller.
Figure 12B:
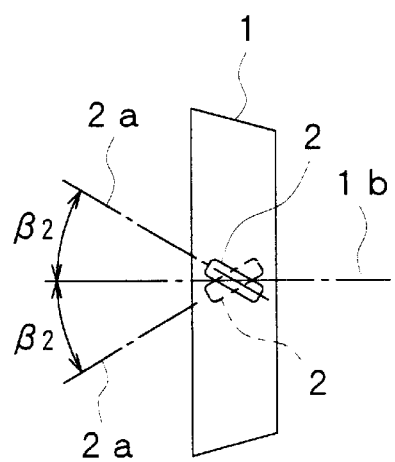
Figure 13:
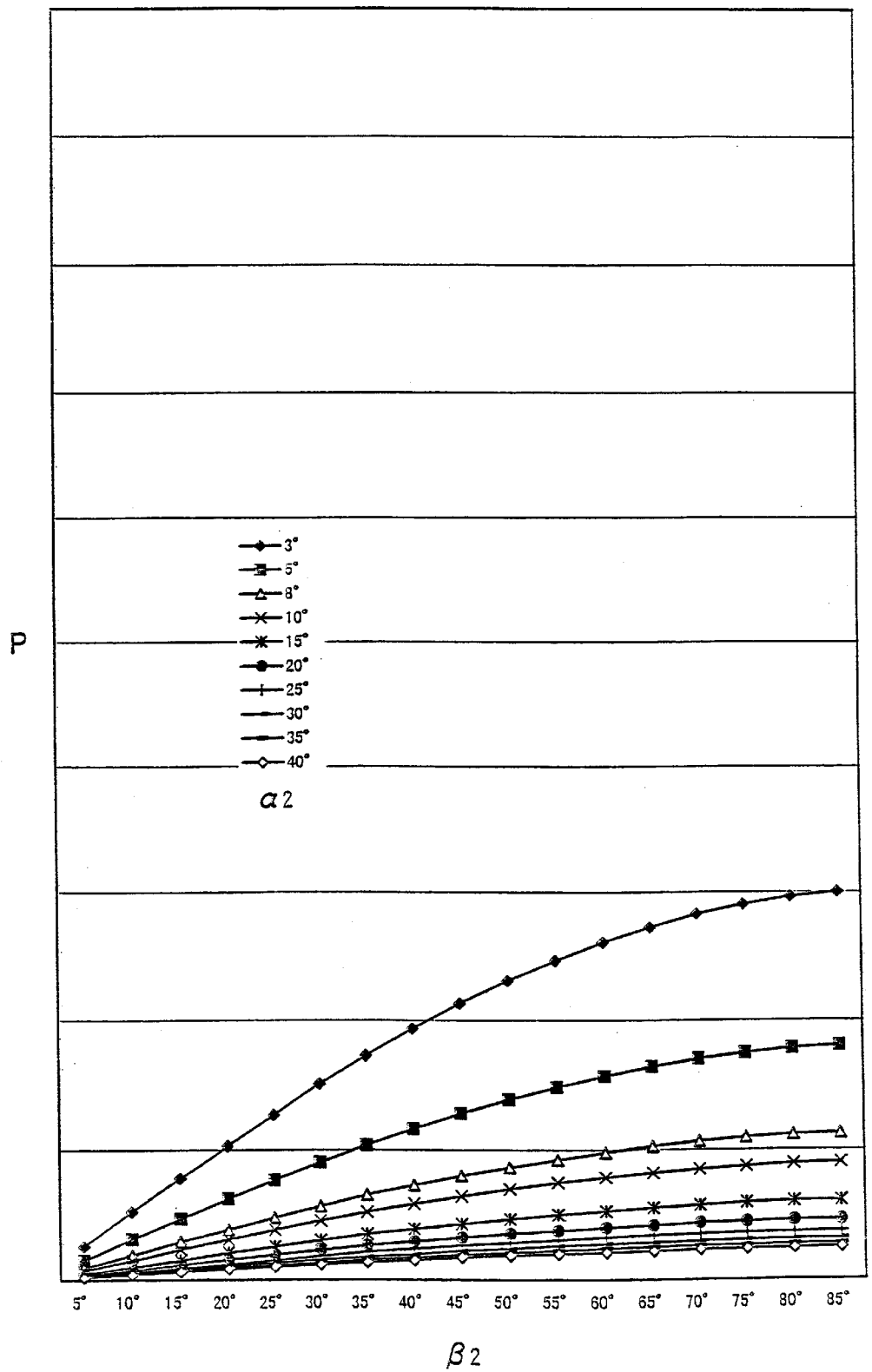
FIG. 13 is a view showing the relation between the inclination angle of the roller and the frictional torque.

FIG. 11 to FIG. 13 show a second embodiment of the present invention, and FIG. 11 is an expansion plan of the roller and cage, and FIG. 12 is a schematic diagram showing the inclination angle of the roller, and FIG. 13 is a view showing the relation between the inclination angle of the roller and the frictional torque.

That is, in the present embodiment, the respective rollers 2 are alternately inclined in the opposite directions relative to the plane including the rotation axis of the clutch member 1, by the same numbers. As shown in FIG. 12A, the turning axis 2a of each roller 2 each has a specific inclination angle α2 relative to the rotation axis 1b of the clutch member 1 and in the meantime, as shown in FIG. 12B, each has a specific inclination angle β2 relative to the plane including the rotation axis 1b of the clutch member 1. In this case, the inclination angle α2 of each roller 2 is set more than 3° and less than 8°, and the inclination angle β2 is set more than 25° and less than 90°. By the way, the inclination angle β2 is an angle seen from the direction at right angles to the turning axis 2a of the roller 2.

According to the above described configuration, in the above described friction clutch, similarly to the first embodiment, a frictional force proportional to the load F in the axial direction can be generated between each roller 2 and each of the clutch members 1, 3. In this case, since the respective rollers 2 are alternately inclined one by one in the opposite directions relative to the plane including the rotation axis of the clutch member 1, an equal frictional force is generated in any rotational direction of the clutch member 1.

In the present embodiment, the applicant has confirmed the relation between the inclination angles α2, β2 of each roller and the frictional torque P in the range of the inclination angle α2 of 3° to 40° and in the range of the inclination angle β2 of 5° to 85° by experiments and theoretical analysis.

That is, as shown in FIG. 13, in the case of any inclination angle α2 of each roller, a characteristic is shown, in which the frictional torque P uniformly decreases when the inclination angle β2 decreases, but when the inclination angle α2 is 8° or more, no frictional torque P of a practically effective value or more can be obtained regardless of the magnitude of the inclination angle β2. Furthermore, even in the case where the inclination angle α2 is less than 20°, no frictional torque P of a practically effective value or more can be obtained when the inclination angle β2 is 25° or less. By the way, in the case where the inclination angle β2 is more than 85°, the confirmation has not been actually performed, but by the above described experimental data, it can be supposed that the frictional torque P when the inclination angle β2 is 90° or less is approximately equal to that in the case of 85°.

By the way, in the above described embodiment, the case where the respective rollers 2 are alternately inclined in the opposite directions one by one relative to the plane including the rotation axis of the clutch member 1 is shown, but it is also possible to incline the respective rollers 2 in the opposite directions by mutually different numbers of pieces.

Figure 14:
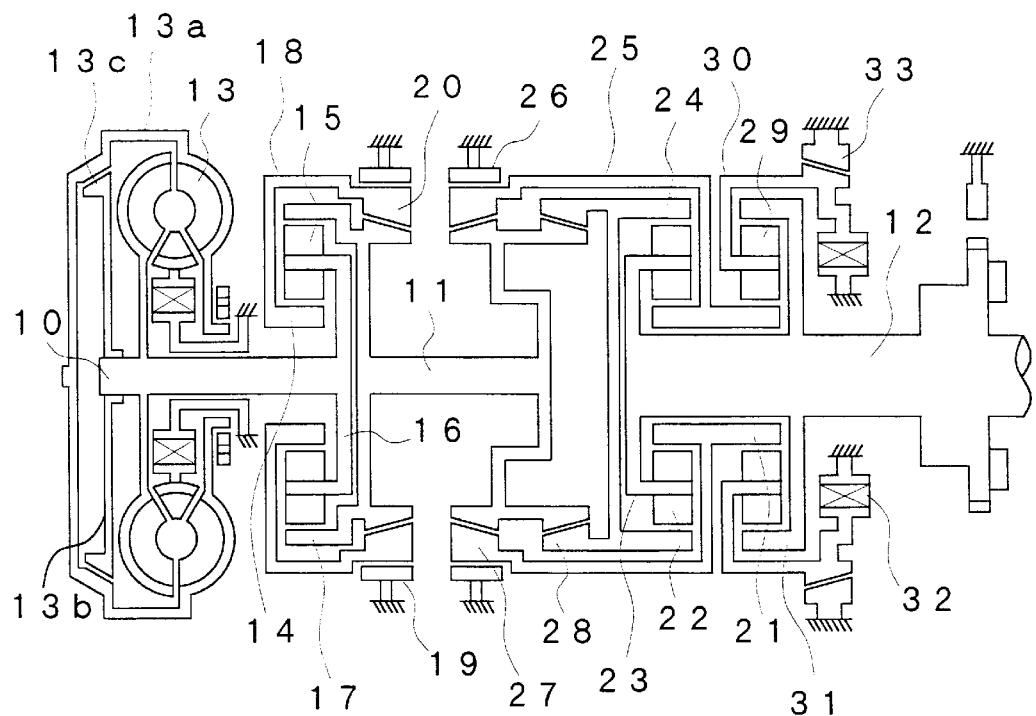
FIG. 14 is a schematic side view of an automatic transmission of an automobile equipped with the friction clutch of the present invention.
Figure 15:
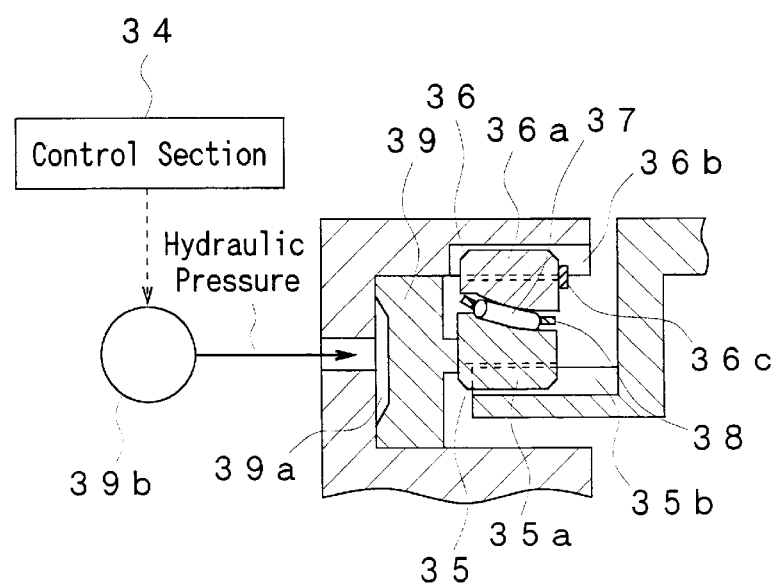
FIG. 15 is a partial side cross sectional view of the clutch used in the automatic transmission.

FIG. 14 and FIG. 15 show an automatic transmission of an automobile equipped with the friction clutch of the present invention.

This automatic transmission comprises: an input shaft 10, a middle shaft 11, and an output shaft 12 which are arranged mutually coaxially; a torque converter 13 which transmits the power between the unillutrated engine side and the input shaft 10 side; a first sun gear 14 which rotates around the input shaft 10; a first planetary gear 15 which is engaged with the first sun gear 14; a first planetary carrier 16 which rotatably holds the first planetary gear 15 and rotates integrally with the input shaft 10; a first internal gear 17 which is engaged with the first planetary gear 15 and rotates integrally with the middle gear 11; a first clutch hub 18 which rotates integrally with the first sun gear 14; a first brake band 19 which can regulate the rotation of the first clutch hub 18; a first clutch 20 which can regulate the rotation of the first clutch hub 18 relative to the middle shaft 11; a second sun gear 21 which rotates around the output shaft 12; a second planetary gear 22 which is engaged with one end side of the second sun gear 21; a second planetary carrier 23 which rotatably holds the second planetary gear 22 and rotates integrally with the output shaft 12; a second internal gear 24 which is engaged with the second planetary gear 22; a second clutch hub 25 which rotates integrally with the second sun gear 21; a second brake band 26 which can regulate the rotation of the second clutch hub 25; a second clutch 27 which can regulate the rotation of the second clutch hub 25 relative to the middle shaft 11; a third clutch 28 which can regulate the rotation of the second internal gear 24 relative to the middle shaft 11; a third planetary gear 29 which is engaged with the other end side of the second sun gear 21; a third planetary carrier 30 which rotatably holds the third planetary gear 29; a third internal gear 31 which is engaged with the third planetary gear 29 and rotates integrally with the output shaft 12; a one-way clutch 32 which regulates the rotation of the third internal gear 31 in one direction; a fourth clutch 33 which can regulate the rotation of the third internal gear 31; and a control section 34 which controls the first, second, third, and fourth clutches 20, 27, 28, 33 and the respective brake bands 19, 26.

The torque converter 13 has the well-known configuration of transmitting the power through fluid, and between a transmitting member 13a on the engine side thereof and a transmitting member 13b on the input shaft 10 side, a lock up clutch 13c which can be connected through no fluid is provided. In the lock up clutch 13c, the transmitting member 13b on the input shaft 10 side rotates integrally with the input shaft 10, and it is movably provided in the axial direction of the input shaft 10.

As shown in FIG. 15, the lock up clutch 13c and the first, second, third, and fourth clutches 20, 27, 28, 33 comprise: a pair of clutch members 35, 36, a lot of rollers 37 which are arranged between the respective clutch members 35, 36, a cage 38 which rotatably holds each roller 37, and a thrust member 39 which thrusts one clutch member 35, and they have the configuration equal to that of the friction clutch shown in the above described first embodiment.

That is, one clutch member 35 is formed like a ring around the rotation axis of the transmission main body, and the outer peripheral surface thereof is opposite to the other clutch member 36. The outer peripheral surface of the clutch member 36 is tapered around the rotation axis of the clutch member 35 and in the meantime, it is formed to have a concave curve in the cross section in parallel to the rotation axis of the clutch member 35. Moreover, the clutch member 35 has a lot of spline-like projections 35a on the inner peripheral surface side, and it is provided movably in the axial direction by fitting each projection 35a in a lot of grooves 35b provided in the member side rotating integrally with the clutch member 35.

The other clutch member 36 is formed like a ring around the rotation axis of the transmission main body, and the inner peripheral surface thereof is opposite to one clutch member 35. The inner peripheral surface of the clutch member 36 is tapered around the rotation axis of the clutch member 36 and in the meantime, it is formed to have a convex curve in the cross section in;parallel to the rotation axis of the clutch member 36. Moreover, the clutch member 36 has a lot of spline-like projections 36a on the outer peripheral surface side, and it is provided movably in the axial direction by fitting each projection 36a in a lot of grooves 36b provided in the member side rotating integrally with the clutch member 36. In this case, to the groove 36b, a stopper 36c for stopping the clutch member 36 is attached.

Each roller 37 has an outer peripheral surface shaped like a pillar uniformly extending in the axial direction, and it is arranged at equal intervals in the circumferential direction of the respective clutch members 35, 36.

The cage 38 is formed like a ring around the rotation axis of the respective clutch members 35, 36, and it is curvedly tapered along the track surface of each of the clutch members 35, 36 and in the meantime, the thickness thereof is formed smaller than the outside diameter of each roller 37. In the cage 38, a lot of holes are provided for rotatably containing each roller 37, and each hole is arranged at equal intervals in the circumferential direction of the cage 38 similarly to the hole 4a shown in FIG. 3 and in the meantime, it is formed so that the turning axis of each roller 37 may be each inclined in the same direction.

The thrust member 39 is formed like a ring around the rotation axis of each of the clutch members 35, 36, and it is movably provided in the axial direction. That is, the thrust member 39 is brought into contact with one clutch member 35 on one end side, so that it may thrust one clutch member 35 by the pressure of hydraulic fluid supplied into a hydraulic chamber 39a on the other end side thereof from a hydraulic pump 39b. By the way, in the case of the lock up clutch 13c, the pressure of the surrounding fluid to the transmitting member 13b is controlled, so that the transmitting member 13b may be thrust in the axial direction of the input shaft 10.

The control section 34 comprises a microcomputer, and it is connected to an unillustrated speed change operating section, a vehicle speed sensor, an opening sensor of an accelerator, or the like, so that it may control the hydraulic pump 39b of the thrust member 39 of the lock up clutch 13c and the first, second, third, and fourth clutches 20, 27, 28, 33 on the basis of the; information thereof.

In the automatic transmission configured as mentioned above, the power of the engine is transmitted to the input shaft 10 through the torque converter 13, and by the electronic control depending on the speed change operation or vehicle speed, the first to fourth clutches 20, 27, 28, 33 and the respective brake bands 19, 26 become in the connected state or unconnected state, respectively, and the respective sun gears 14, 21, the respective planetary gears 15, 22, 29, the respective planetary carriers 16, 23, 30, and the respective internal gears 17, 24, 31 become in the rotating state or unrotating state, respectively to make up the power transmission passage according to each speed changing position. Furthermore, at each time of the above described speed changing, the lock up clutch 13*c* is connected, so that the power on the engine side may be transmitted to the input shaft 10 side without generating the rotational difference. At that moment, when the thrust force of the thrust member 39 is applied to the clutch member 36 while connecting the respective clutches 13*c*, 20, 27, 28, 33, similarly to the above described first embodiment, each roller 37 generates sliding friction while turning, and therefore, the wear is extremely smaller than that of the structure of bringing the respective fellow clutch plates into surface contact with each other like a multiple disk clutch, and the durability can be remarkably improved. Accordingly, when changing speed, the connection can be performed after continuing the sliding state of the respective clutches 13*c*, 20, 27, 28, 33 for a long time, so that the shock in speed changing can largely be reduced.

By the way, the speed changing mechanism in the automatic transmission of the present embodiment is a well-known mechanism, and the description of the combination of gears for each speed changing position will be omitted. Furthermore, the arrangement of gears of the automatic transmission of the present embodiment is one example, and the friction clutch of the present invention can be applied to another automatic transmission which is different in the arrangement of gears according to the number of stages of speed changing or the like.

Figure 16:
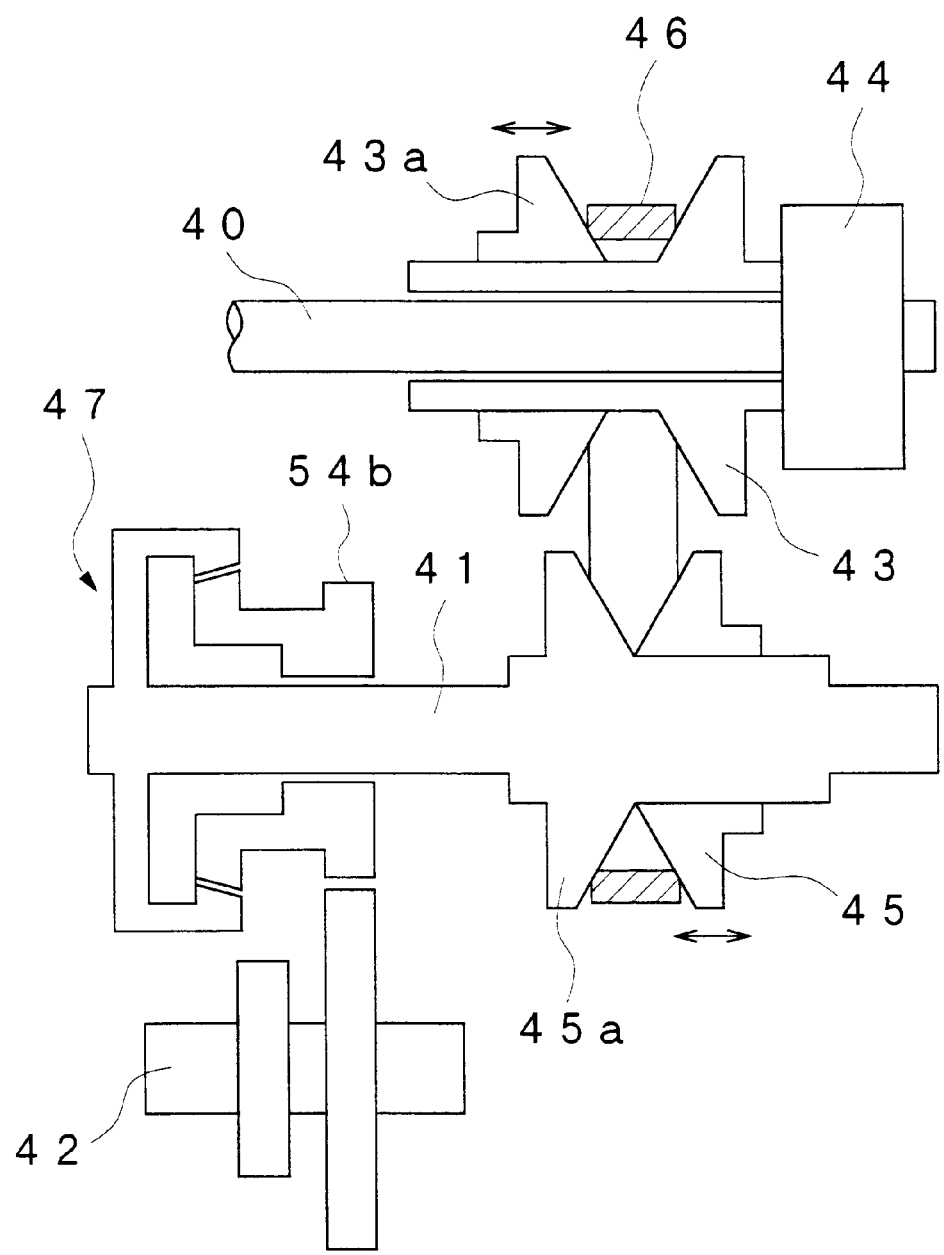
FIG. 16 is a schematic side view of a non-stage transmission of an automobile equipped with the friction clutch of the present invention.
Figure 17:
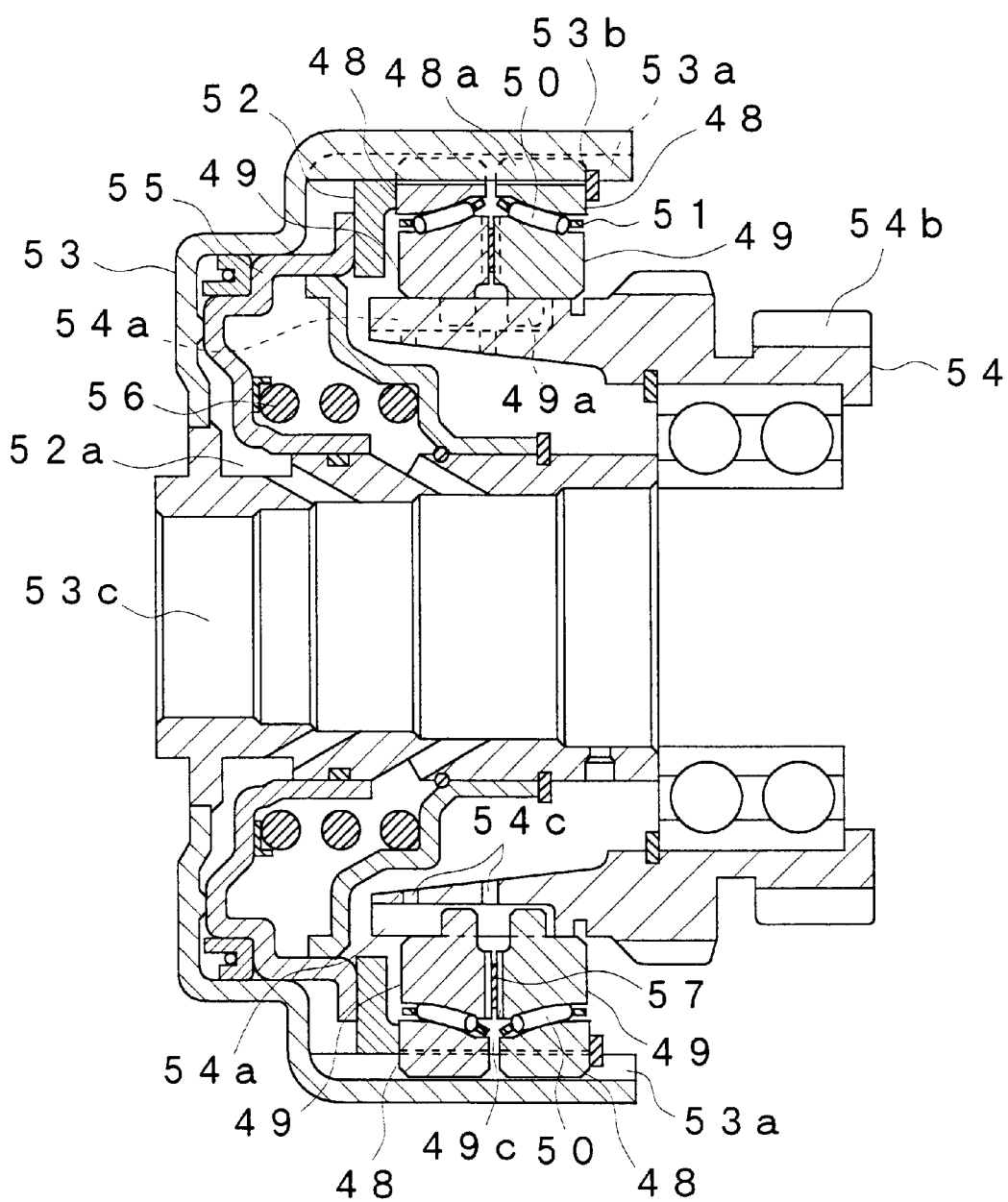
FIG. 17 is a side cross sectional view of the clutch used in the non-stage transmission.
Figure 18:
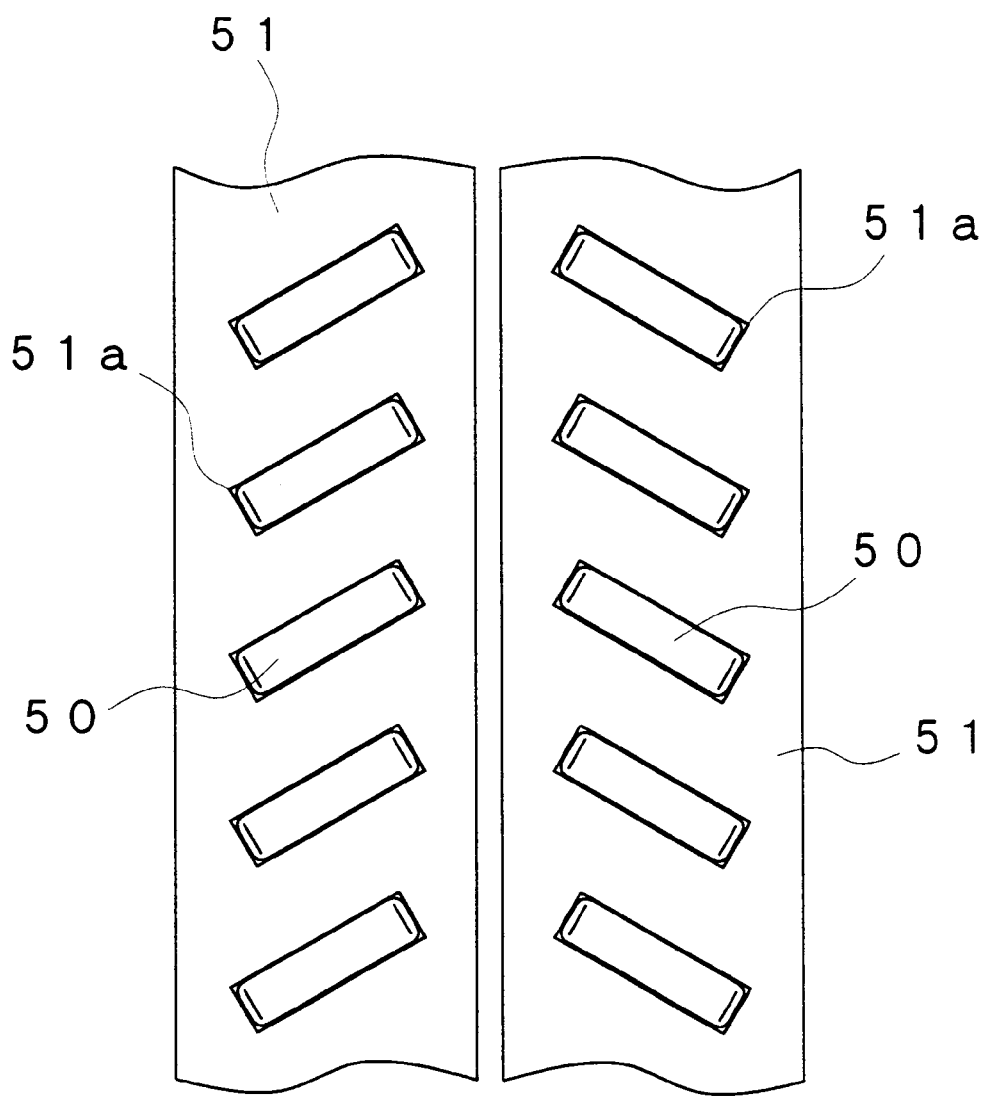
FIG. 18 is a plan view of the roller and the cage.

FIG. 16 to FIG. 18 show a non-stage transmission of an automobile equipped with the friction clutch of the present invention.

This non-stage transmission comprises: an input shaft 40, a middle shaft 41, and an output shaft 42 which are arranged in parallel with one another; a first variable diameter pulley 43 which is arranged coaxially with the input shaft 40 and is rotated by the input shaft 40; a forward and backward movement switching mechanism 44 which switches the rotation of the first variable diameter pulley 43 between the forward rotation and the reverse rotation; a second variable diameter pulley 45 which rotates integrally with the middle shaft 41; a belt 46 which is wound up on the respective pulleys 43, 45; a starting clutch 47 which transmits the power of the middle shaft 41 to the output shaft 42; and an unillustrated control section which controls the connection and cut-off of the clutch 47.

As shown in FIG. 17, the clutch 47 comprises: a pair of clutch members 48, 49; a lot of rollers 50 which are arranged between the respective clutch members 48, 49; a cage 51 which rotatably holds each roller 50; and a thrust member 52 which thrusts one clutch member 48. Furthermore, this clutch 47 is a clutch having two friction clutches with the configuration equal to that of the friction clutch shown in the above described first embodiment provided in the axial direction.

That is, each one clutch member 48 is formed like a ring around the rotation axis thereof, and the inner peripheral surface thereof is opposite to the other clutch member 49. The inner peripheral surface of the clutch member 48 is tapered around the rotation axis of the clutch member 48 and in the meantime, it is formed to have a convex curve in the cross section in parallel to the rotation axis of the clutch member 48. Moreover, the clutch member 48 has a lot of spline-like projections 48*a* on the peripheral surface side, and it is provided movably in the axial direction by fitting each projection 48*a* in a lot of grooves 53*a* provided in a rotary member 53 rotating integrally with the clutch member 48. In this case, to the groove 53*a*, a stopper 53*b* for stopping the clutch member 48 on one end side in the axial direction is attached. Furthermore, to the rotary member 53, a connecting section 53*c* for being connected to the middle shaft 41 is provided.

Each of the other clutch members 49 is formed like a ring around the rotation axis thereof, and the outer peripheral surface thereof is opposite to one clutch member 48. The outer peripheral surface of the clutch member 49 is tapered around the rotation axis of the clutch member 49 and in the meantime, it is formed to have a concave curve in the cross section in parallel to the rotation axis of the clutch member 49. Moreover, the clutch member 49 has a lot of spline-like projections 49*a* on the inner peripheral surface side, and it is provided movably in the axial direction by fitting each projection 49*a* in a lot of grooves 54*a* provided in a rotary member 54 rotating integrally with the clutch member 49. Furthermore, to the rotary member 54, a gear 54*b* to be engaged with a gear 42*a* of the output shaft 42 is provided.

Each roller 50 has an outer peripheral surface shaped like a pillar uniformly extending in the axial direction, and it is arranged at equal intervals in the circumferential direction of the respective clutch members 48, 49.

Each cage 51 is formed like a ring around the rotation axis of the respective clutch members 48, 49, and it is curvedly tapered along the opposite surfaces of the respective clutch members 48, 49 and in the meantime, the thickness thereof is formed smaller than the outside diameter of each roller 50. As shown in FIG. 18, in each cage 51, a lot of holes 51*a* for rotatably containing each roller 50 are provided, and each hole 51*a* is arranged at equal intervals in the circumferential direction of the cage 51. Furthermore, each hole 51*a* is formed so that the turning axis of each roller 50 may be each inclined in the same direction and in the meantime, the respective cages 51 are mutually provided so that each hole 51*a* may be inclined in the opposite directions.

The thrust member 52 is formed like a ring around the rotation axis of the respective clutch members 48, 49, and it is movably provided in the axial direction. That is, the thrust member 52 has one end side brought into contact with the clutch member 48 on the other end side in the axial direction, so that it thrusts one clutch member 48 by the pressure of hydraulic fluid supplied into a hydraulic chamber 52*a* provided between a movable member 55 arranged on the other end side thereof and one rotary member 53. In this case, the movable member 55 is urged to the opposite side in the above described thrusting direction by a spring 56.

In the non-stage transmission configured as mentioned above, when the power of an unillustrated engine is transmitted to the input shaft 40, the torque of the input shaft 40 is transmitted to the first variable diameter pulley 43 through the forward and backward movement switching mechanism 44, and the torque of the first variable diameter pulley 43 is transmitted to the second variable diameter pulley 45 through the belt 46. At that moment, by moving a movable section 43*a* of the first variable diameter pulley 43 and a movable section 45*a* of the second variable diameter pulley 45, respectively in the axial direction, the diameter of each of the pulleys 43, 45 (diameter of the part with which the belt 46 is brought into contact) changes, so that the rotational speed of the middle shaft 41 relative to the input shaft 40 may continuously be changed. Furthermore, by connecting the clutch 47, the torque of the middle shaft 41 is transmitted to the output shaft 42, and the power of the output shaft 42 is transmitted to the unillustrated drive wheel side. At that moment, by applying a specific thrusting force to one clutch member 48 by using the thrust member 52 of the clutch 47, similarly to the above described first embodiment, each roller 50 generates sliding friction while turning, and therefore, the wear is extremely smaller than that of the structure of bringing the respective fellow clutch plates into surface contact with each other like a multiple disk clutch, and the durability can be remarkably improved. Accordingly, when creeping occurs, the sliding friction of the clutch 47 can be increased, and a sufficient creeping force equal to that of the torque converter can be obtained.

Furthermore, in the above described embodiment, as shown in FIG. 18, the roller 50 of each cage 51 is arranged to be inclined mutually in the opposite direction relative to the plane including the rotation axis of the respective clutch members 48, 49, and therefore, in one rotational direction, the respective cages 51 tend to be separated from each other in the axial direction, and in the other rotational direction, the respective cages 51 approach each other in the axial direction to come into contact with each other. Therefore, a spacer 57 with an arbitrary thickness is put between the respective clutch members 49, and by arbitrarily setting the thickness of this spacer 57, the contact position in the axial direction of the respective fellow cages 51 can be adjusted. Furthermore, in the above described embodiment, a plurality of grooves 49c penetrating and extending in the radial direction are provided at intervals in the circumferential direction in the opposite surfaces in the axial direction of the respective clutch members 49, so that the lubricating oil can be surely supplied to each roller 50 through the hole 54c provided in the other rotary member 54 and each groove 49c.

Figure 19:
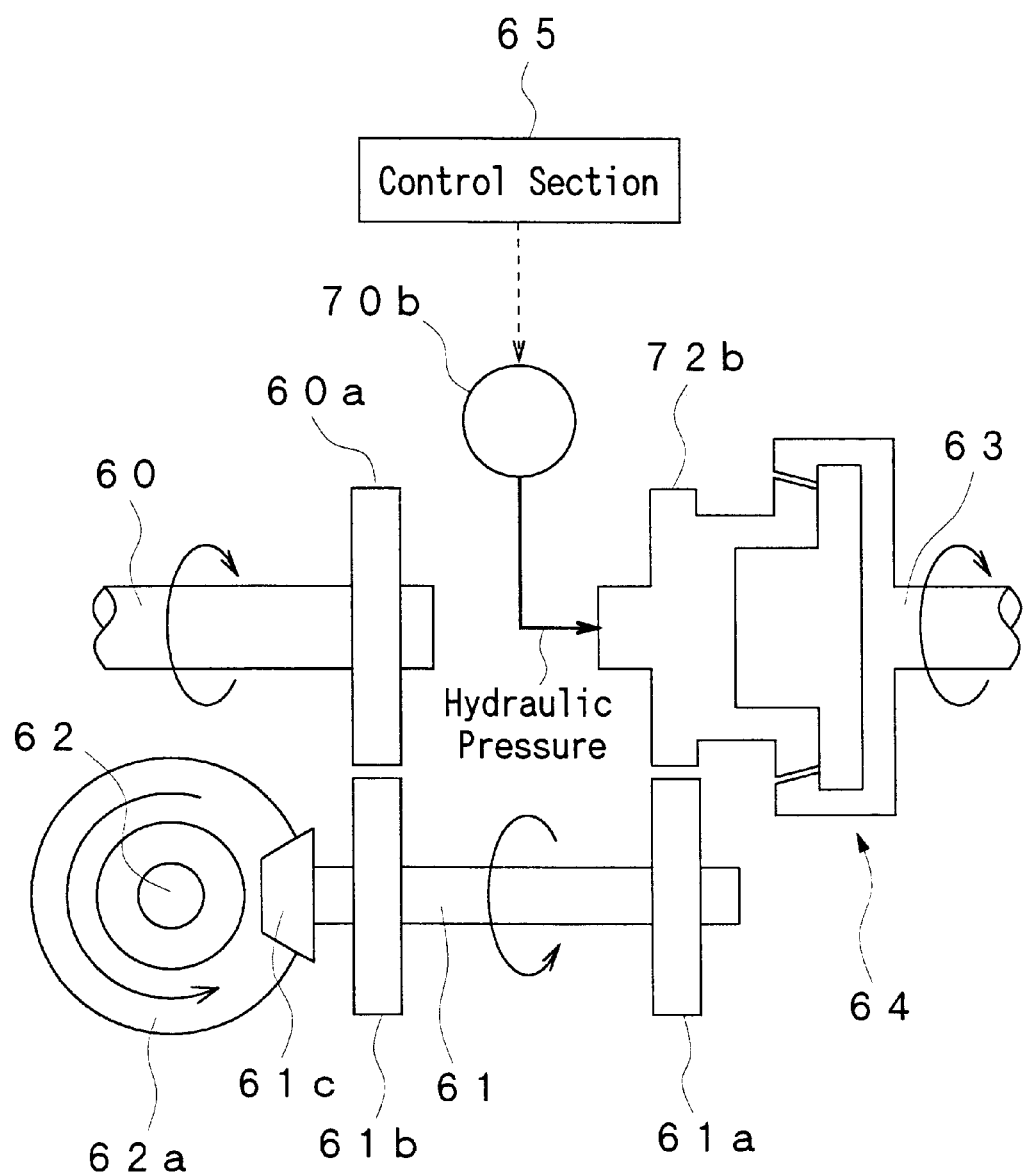
FIG. 19 is a schematic side view of a power distribution device of an automobile equipped with the friction clutch of the present invention.
Figure 20:
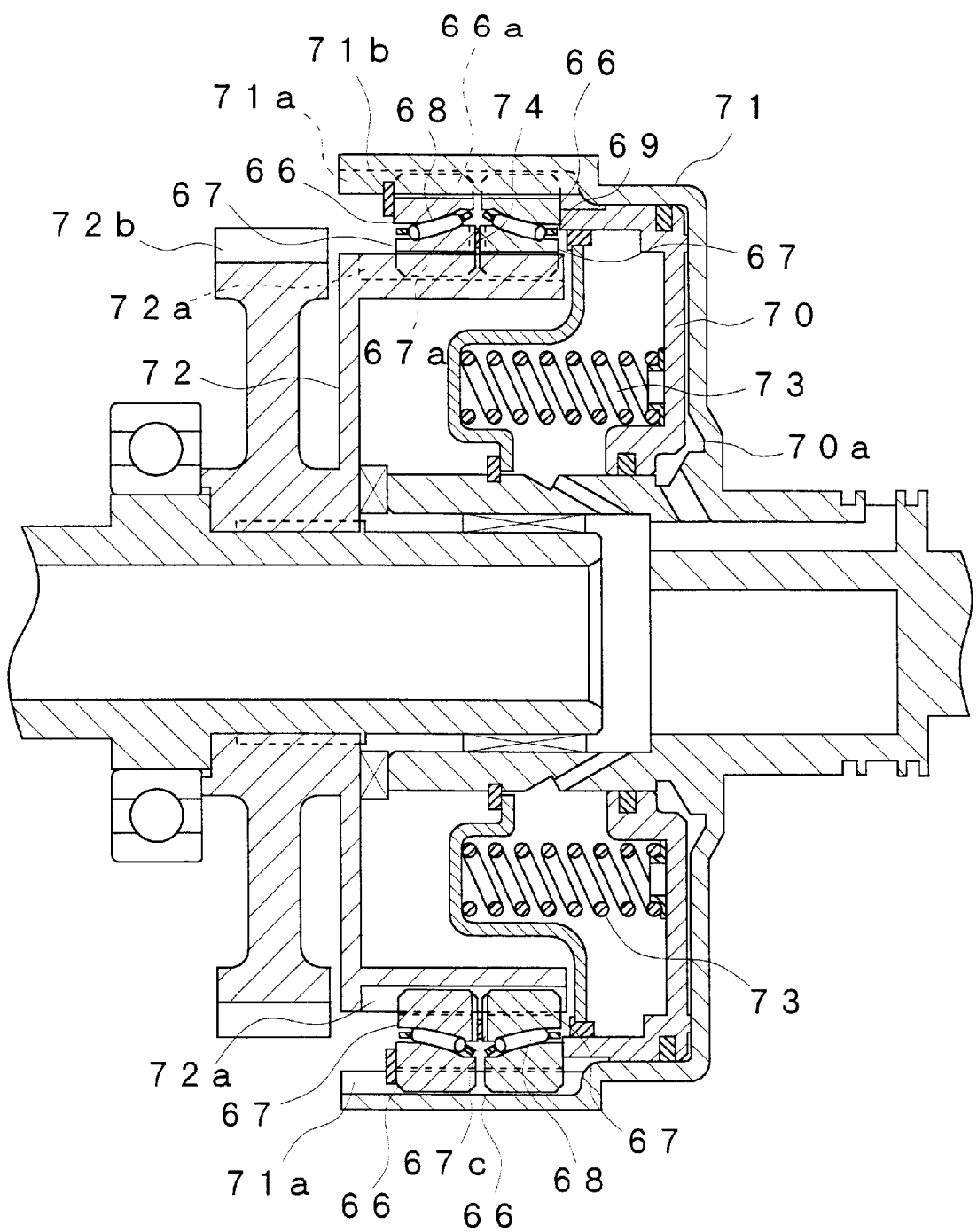
FIG. 20 is a side cross sectional view of the clutch used in the power distribution device.

FIG. 19 and FIG. 20 show a power distribution device of an automobile equipped with the friction clutch of the present invention.

This power distribution device comprises: a first drive shaft 60 which is rotated by an unillustrated engine; a second drive shaft 61 which is rotated by the first drive shaft 60; a front wheel side drive shaft 62 which is rotated by the second drive shaft 61; a clutch 64 which is arranged between the second drive shaft 61 and a rear wheel side drive shaft 63; and a control section 65 which controls the clutch 64.

As shown in FIG. 20, the clutch 64 comprises: a pair of clutch members 66, 67; a lot of rollers 680 which are arranged between the respective clutch members 66, 67; a cage 69 which rotatably holds each roller 68; and a thrust member 70 which thrusts one clutch member 66. Furthermore, this clutch 64 is a clutch which has two friction clutches with the configuration equal to that of the friction clutch shown in the above described first embodiment:provided in the axial direction.

That is, each of clutch members 66 is formed like a ring around the rotation axis thereof, and the inner peripheral surface thereof is opposite to the other clutch member 67. The inner peripheral surface of the clutch member 66 is tapered around the rotation axis of the clutch member 66 and in the meantime, it is formed to have a convex curve in the cross section in parallel to the rotation axis of the clutch member 66. Moreover, the clutch member 66 has a lot of spline-like projections 66a on the outer peripheral surface side, and it is provided movably in the axial direction by fitting each projection 66a in a lot of grooves 71a provided in a rotary member 71 rotating integrally with the clutch member 66. In this case, to the groove 71a, a stopper 71b for stopping the clutch member 66 on one end side in the axial direction is attached.

Each of the other clutch members 67 is formed like a ring around the rotation axis thereof, and the-outer peripheral surface thereof is opposite to one clutch member 66. The outer peripheral surface of the clutch member 67 is tapered around the rotation axis of the clutch member 67 and in the meantime, it is formed to have a concave curve in the cross section in parallel to the rotation axis of the clutch member 67. Moreover, the clutch member 67 has a lot of spline-like projections 67a on the inner peripheral surface side, and it is provided movably in the axial direction by fitting each projection 67a in a lot of grooves 72a provided in a rotary member 72 rotating integrally with the clutch member 67. Furthermore, to the rotary member 72, a gear 72b to be engaged with a gear 61a of the second drive shaft 61 is provided.

Each roller 68 has an outer peripheral surface shaped like a pillar uniformly extending in the axial direction, and it is arranged at equal intervals in the circumferential direction of the respective clutch members 66, 67.

Each cage 69 is formed like a ring around the rotation axis of the respective clutch members 66, 67, and it is curvedly tapered along the opposite surfaces of the respective clutch members 66, 67 and in the meantime, the thickness thereof is formed smaller than the outside diameter of each roller 68. In each cage 69, a lot of holes for rotatably containing each roller 68 are provided, and each hole is arranged at equal intervals in the circumferential direction of the cage 69 similarly to the hole 4a shown in FIG. 3 and in the meantime, it is formed so that the turning axis of each roller 68 may be each inclined in the same direction, and similarly to those shown in FIG. 18, the respective cages 69 are mutually provided so that each hole may be inclined in the opposite directions.

The thrust member 70 is formed like a ring around the rotation axis of the respective clutch members 66, 67, and it is movably provided in the axial direction. That is, the thrust member 70 has one end side brought into contact with the clutch member 66 on the other end side in the axial direction, so that it may thrust one clutch member 66 by the pressure of hydraulic fluid supplied from a hydraulic pump 70b into a hydraulic chamber 70a provided on the other end side thereof. In this case, the thrust member 70 is urged to the opposite side in the above described thrusting direction by a spring 73.

The control section 65 comprises a microcomputer, and the information on the running condition of an automobile is inputted from a sensor for detecting the speed of each wheel of the automobile, a sensor for detecting the acceleration in the forward and backward and the rightward and leftward directions of the automobile, or the like, so that the hydraulic pump 70b may be controlled on the basis of this information.

In the power distribution device configured as mentioned above, when the first drive shaft 60 is rotated by the power of the engine, the power of the first drive shaft 60 is transmitted to the second drive shaft 61 through the gears 60a, 61b, and the power of the second drive shaft 61 is transmitted to the front wheel side drive shaft 62 through the gears 61c, 62a. Here, by connecting the clutch 64, the power of the second drive shaft 61 is transmitted to the rear wheel side drive shaft 63, and the power of the engine is distributed to the front wheel side drive shaft 62 and the rear wheel side drive shaft 63, respectively. At that moment, the thrust force of the thrust member 70 is controlled by the control section 65, so that the torque distribution ratio to the rear wheel side drive shaft 63 may be arbitrarily controlled by utilizing the sliding of the clutch 64. In this case, similarly to the above described first embodiment, each roller 68 generates sliding friction while turning, and therefore, the wear is extremely smaller than that of the structure of bringing the respective fellow clutch plates into surface contact with each other like a multiple disk clutch, and the durability can be remarkably improved.

Furthermore, in the above described embodiment, a spacer 74 is put between the respective clutch members 66 brought into contact with each other, and by arbitrarily setting the thickness of this spacer 74, the contact position in the axial direction of the respective fellow cages 69 can be adjusted. Furthermore, in the above described embodiment, a plurality of grooves 67c penetrating and extending in the radial direction are provided at intervals in the circumferential direction in the opposite surfaces in the axial direction of the respective clutch members 67, respectively, and the lubricating oil can be surely supplied to each roller 68 through each groove 67c.

By the way, in the above described embodiment, a device of driving the front wheel side at all times is shown, but it may be a device of driving the rear wheel side at all times and transmitting the driving force to the front wheel side when distributing the power.

Figure 21:
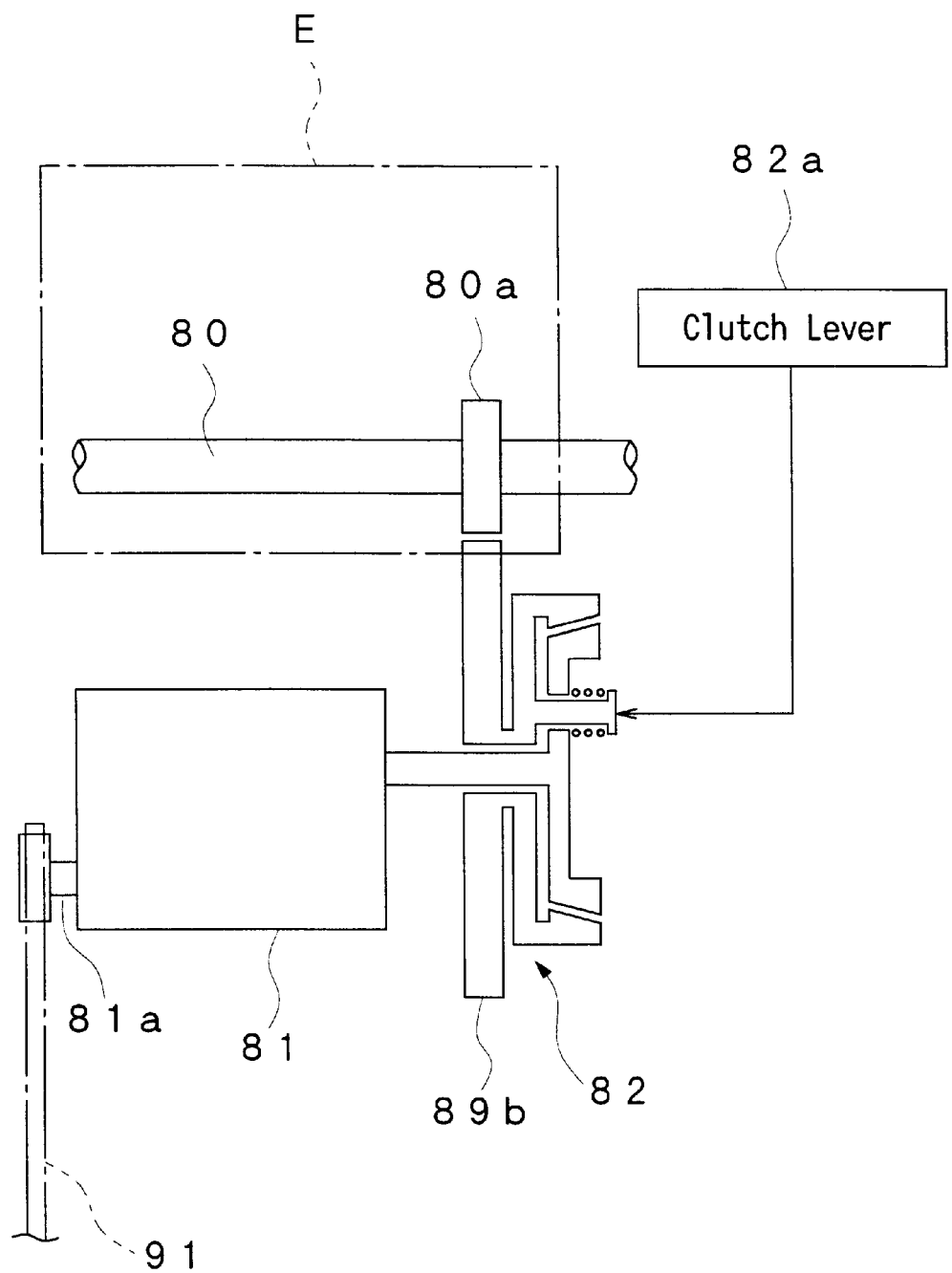
FIG. 21 is a schematic side view of a power transmission device of a motorcycle equipped with the friction clutch of the present invention.
Figure 22:
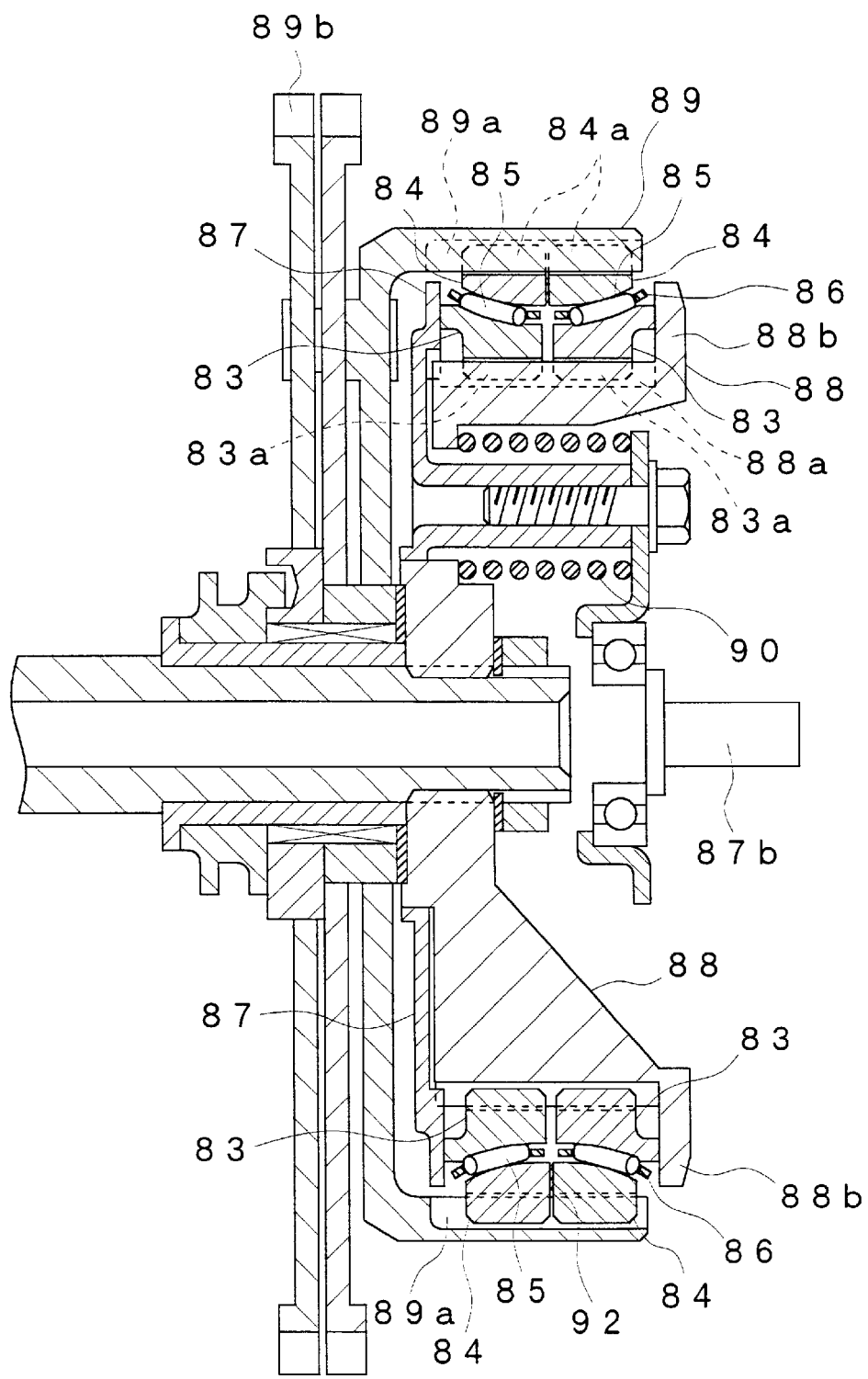
FIG. 22 is a side cross sectional view of the clutch used in the power transmission device.

FIG. 21 and FIG. 22 show a power transmission device of a motorcycle equipped with the friction clutch of the present invention.

This power transmission device comprises: an engine side drive shaft 80 which is rotated by the power of an engine E; a transmission 81 which is operated by an unillustrated speed changing lever; and a clutch 82 which is arranged between the engine side drive shaft 80 and the transmission 81.

As shown in FIG. 22, the clutch 82 comprises: a pair of clutch members 83, 84; a lot of rollers 85 which are arranged between the respective clutch members 83, 84; a cage 86 which rotatably holds each roller 85; and a thrust member 87 which thrusts one clutch member 83. Furthermore, this clutch 82 is a clutch which has two friction clutches with the configuration equal to that of the friction clutch shown in the above described first embodiment provided in the axial direction.

That is, each of clutch members 83 is formed like a ring around the rotation axis thereof, and the outer peripheral surface thereof is opposite to the other clutch member 84. The outer peripheral surface of the clutch member 83 is tapered around the rotation axis of the clutch member 83 and in the meantime, it is formed to have a concave curve in the cross section in parallel to the rotation axis of the clutch member 83. Moreover, the clutch member 83 has a lot of spline-like projections 83a on the inner peripheral surface side, and it is provided movably in the axial direction by fitting each projection 83a in a lot of grooves 88a provided in a rotary member 88 rotating integrally with the clutch member 83. In this case, to one end side of the groove 88a, a stopper 88b for stopping the clutch member 83 on one end side in the axial direction is provided.

Each of the other clutch members 84 is formed like a ring around the rotation axis thereof, and the inner peripheral surface thereof is opposite to one clutch member 83. The inner peripheral surface of the clutch member 84 is tapered around the rotation axis of the clutch member 84 and in the meantime, it is formed to have a convex curve in the cross section in parallel to the rotation axis of the clutch member 84. Moreover, the clutch member 84 has a lot of spline-like projections 84a on the outer peripheral surface;side, and it is provided movably in the axial direction by fitting each projection 84a in a lot of grooves 89a provided in a rotary member 89 rotating integrally with the clutch member 84.

Furthermore, to the rotary member 89, a gear 89b to be engaged with a gear 80a of the engine side drive shaft 80 is provided.

Each roller 85 has an outer peripheral surface shaped like a pillar uniformly extending in the axial direction, and it is arranged at equal intervals in the circumferential direction of the respective clutch members 83, 84.

Each cage 86 is formed like a ring around the rotation axis of the respective clutch members 83, 84, and it is curvedly tapered along the opposite surfaces of the respective clutch members 83, 84 and in the meantime, the thickness thereof is formed smaller than the outside diameter of each roller 85. In each cage 86, a lot of holes for rotatably containing each roller 85 are provided, and each hole is arranged at equal intervals in the circumferential direction of the cage 86 similarly to that shown in FIG. 3 and in the meantime, it is formed so that the turning axis of each roller 85 may be each inclined in the same direction, and similarly to those shown in FIG. 18, the respective cages 86 are mutually provided so that each hole may be inclined in the opposite directions.

The thrust member 87 is arranged on the other end side in the axial direction of one clutch member 83, and it is movably provided in the axial direction. That is, the thrust member 87 has one end side brought into contact with the clutch member 83 on the other end side in the axial direction, so that it may thrust one clutch member 83 by a spring 90 stopped by one rotary member 88. Furthermore, with the thrust member 87, a contact member 87b moving with the operation of a clutch lever 82a attached to a handle (unillustrated) of a motorcycle is brought into contact from one end side in the axial direction, so that the contact member 87b may move the thrust member 87 against the urging force of the spring 90 to the other end side in the axial direction by the operation of the clutch lever 82a.

In the power transmission device of a motorcycle configured as mentioned above, when the engine side drive shaft 80 is rotated by the power of the engine E, the power of the engine side drive shaft 80 is transmitted to the transmission 81 through the clutch 82, and the power of the output shaft 81a of the transmission 81 is transmitted to the unillustrated drive wheel through a chain 91. Moreover, when starting and stopping or when changing speed, by operating the clutch lever 82a, the connection and cut-off of the clutch 82 is performed. At that moment, in the state of half-clutch, similarly to the above described first embodiment, each roller 85 generates sliding friction while turning, and therefore, even in the case of often using the half-clutch when starting or when changing speed, the wear is extremely smaller than that of the structure of bringing the respective fellow clutch plates into surface contact with each other like a multiple disk clutch, and the durability can be remarkably improved. Furthermore, each roller 85 is inclined in the same direction relative to the plane including the rotation axis of the respective clutch members 83, 84, and therefore, as mentioned in the above described first embodiment, the frictional force in one rotational direction is larger than that in the other rotational direction at all times. In this case, each roller is arranged in two lines in the direction equal to that in FIG. 18, and therefore, each roller 85 of each line agrees with one another in the rotational direction in which the frictional force is large, and each agrees with one another in the rotational direction in which the frictional force is small. Consequently, by making the setting so that the rotational direction on the acceleration side may be the rotational direction in which the frictional force is large, the frictional force at the time of deceleration can be reduced, and therefore, the excessive engine-brake of, for example, a 4-cycle engine can be relieved, which is practically extremely advantageous.

Furthermore, in the above described embodiment, a spacer 92 is put between the respective clutch members 84 which are brought into contact with each other, and by arbitrarily setting the thickness of this spacer 92, the contact position in the axial direction of the respective fellow cages 86 can be adjusted.

What is claimed is:

1. A friction clutch comprising:
   a pair of clutch members which are coaxially and relatively rotatably arranged with peripheral surfaces opposite to each other in the radial direction and in which each opposite surface is formed to be inclined from one end side toward the other end side in the axial direction;
   a lot of rollers which are arranged between the opposite surfaces of the respective clutch members;
   a holder which rotatably holds each roller mutually at intervals in the circumferential direction of each clutch member; and
   thrust means which can thrust in the axial direction at least one of the respective clutch members in the direction in which the opposite surfaces of the respective clutch members approach each other,
   wherein a turning axis of each roller is inclined to have a specific angle relative to a rotation axis of the clutch member and the angle between the turning axis and the rotation axis is made more than 10° and less than 20°, and
   the turning axis of each roller is inclined in the same direction to each have a specific angle relative to a plane including the rotation axis of the clutch member and the angle between the turning axis and the plane is made more than 25° and less than 90°.

2. The friction clutch according to claim 1, wherein said respective clutch members are provided in the axial direction in a plurality of pieces.

3. The friction clutch according to claim 1, wherein each contact surface to the roller in each of said clutch members is formed to be convex relative to an outer peripheral surface of the roller in a cross section including the turning axis of the roller.

4. The friction clutch according to claim 1, wherein an outer peripheral surface of the roller which is brought into contact with each of said clutch members is each formed to be convex relative to the contact surface of each clutch member in the cross section including the turning axis of the roller.

5. An automatic transmission of an automobile, comprising:
   an input shaft and an output shaft which are arranged mutually coaxially;
   a torque converter which transmits power between the input shaft side and an engine side;
   at least one central gear which is arranged coaxially with the input shaft and the output shaft;
   at least one pair of planetary gears which are rotatably held by a holder rotatable around the input shaft and the output shaft and which are engaged with the central gear;
   at least one internal gear which is engaged with the planetary gears;
   a plurality of clutches which can regulate relative rotation between specific members among an engine side member of the torque converter, said input shaft side member of the torque converter, the central gear, the holder of the planetary gears, the internal gear, and a transmission main body; and
   control means which each controls connection and cut-off of each clutch according to change of speed, wherein
   a plurality of friction clutches according to claim 1, are provided as said respective clutches, and
   each clutch member of each friction clutch is individually provided between specific members among the engine side member of said torque converter, said input shaft side member of the torque converter, the central gear, the holder of the planetary gear, the internal gear, and the transmission main body, and
   thrust means of each friction clutch is each controlled by said control means.

6. A non-stage transmission of an automobile, comprising:
   a first variable diameter pulley which rotates integrally with an input shaft;
   a second variable diameter pulley which rotates integrally with an output shaft;
   a belt which is wound up on each pulley;
   a starting clutch which is arranged between the output shaft and a drive wheel side; and
   control means which controls connection and cut-off of the clutch, wherein
   the friction clutch according to claim 1, is provided as said clutch, and
   one clutch member of the friction clutch is provided on the engine side and the other clutch member of the friction clutch is provided on the input shaft side, and thrust means of the friction clutch is controlled by said control means.

7. A power distribution device of an automobile, comprising:
   a clutch which is arranged between a drive shaft on the front wheel side and a drive shaft on the:rear wheel side of an automobile; and
   control means which controls connection and cut-off of the clutch,
   power of an engine to be transmitted to a drive shaft on the front wheel side or on the rear wheel side being transmitted to both drive shafts on the front wheel side and on the rear wheel side by connection of said clutch, wherein
   the friction clutch according to claim 1, is provided as said clutch, and
   one clutch member of the friction clutch is provided to one of the drive shafts on the front wheel side and on the rear wheel side and the other clutch member of the friction clutch is provided to the other of the drive shafts on the front wheel side and on the rear wheel side, and thrust means of the friction clutch is controlled by said control means.

8. A power transmission device of a motorcycle, comprising a clutch which intermittently transmits power of an engine to a drive wheel side by operation of a clutch lever, wherein
   the friction clutch according to claim 1, is provided as said clutch, and
   one clutch member of the friction clutch is provided on the engine side and the other clutch member of the friction clutch is provided on the drive wheel side, and thrust means of the friction clutch is controlled by said clutch lever.

9. A friction clutch, comprising:

a pair of clutch members which are coaxially and relatively rotatably arranged with peripheral surfaces opposite to each other in the radial direction and in which each opposite surface is formed to be inclined from one end side toward the other end side in the axial direction;

a lot of rollers which are arranged between the opposite surfaces of the respective clutch members;

a holder which rotatably holds each roller mutually at intervals in the circumferential direction of each clutch member; and thrust means which can thrust in the axial direction at least one of the respective clutch members in the direction in which the opposite surfaces of the respective clutch members approach each other, wherein turning axes of the respective rollers are inclined to have a specific angle relative to a rotation axis of the clutch member and the angle between the turning axis and the rotation axis is made more than 3° and less than 8°, and the turning axes of the respective rollers are inclined in the opposite directions by specific numbers of pieces to have a specific angle relative to a plane including the rotation axis of the clutch member and the angle between the turning axis and the plane is made more than 25° and less than 90°.

10. The friction clutch according to claim 9, wherein the rollers which are inclined mutually in the opposite directions relative to the plane including the rotation axis of said clutch member are alternately arranged in the circumferential direction of the clutch member by the same numbers.

* * * * *